United States Patent
Mafune et al.

(10) Patent No.: US 7,699,924 B2
(45) Date of Patent: *Apr. 20, 2010

(54) AQUEOUS INK, INK JET RECORDING METHOD, INK CARTRIDGE, RECORDING UNIT AND INK JET RECORDING APPARATUS

(75) Inventors: Kumiko Mafune, Kawasaki (JP); Mikio Sanada, Kawasaki (JP); Kenji Moribe, Fujisawa (JP); Tomonari Watanabe, Kawasaki (JP); Daiji Okamura, Yokohama (JP); Satoshi Kudo, Yokohama (JP); Fumiharu Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/860,109

(22) Filed: Sep. 24, 2007

(65) Prior Publication Data

US 2008/0018722 A1    Jan. 24, 2008

Related U.S. Application Data

(63) Continuation of application No. PCT/JP2007/061039, filed on May 24, 2007.

(30) Foreign Application Priority Data

May 25, 2006  (JP) ............................. 2006-145354
May 23, 2007  (JP) ............................. 2007-136687

(51) Int. Cl.
 *C09D 11/02* (2006.01)
(52) U.S. Cl. .................... 106/31.89; 106/31.6
(58) Field of Classification Search ............... 106/31.6, 106/31.89
See application file for complete search history.

(56) References Cited

U.S. PATENT DOCUMENTS 5,078,790 A    1/1992    Tochihara et al. ............. 106/20

(Continued)

FOREIGN PATENT DOCUMENTS

EP    1473340    11/2004

(Continued)

OTHER PUBLICATIONS

International Preliminary Report on Patentability and the Written Opinion of the International Searching Authority of International Application No. PCT/JP2007/061039 dated Dec. 11, 2008.

(Continued)

*Primary Examiner*—Jerry Lorengo
*Assistant Examiner*—Veronica Faison Gee
(74) *Attorney, Agent, or Firm*—Fitzpatrick, Cella, Harper & Scinto

(57) ABSTRACT

Provided herein is an aqueous ink, which is excellent in both image density and fixing ability irrespective of the kind of a recording medium even when the volume of an ink droplet is small and has such excellent properties that white stripes are not caused even when high-speed recording is conducted. The aqueous ink comprises at least water, a water-soluble organic solvent, a water-insoluble coloring material, a surfactant and a poor medium for the water-insoluble coloring material and/or a salt. The dynamic surface tension of the aqueous ink at a lifetime of 50 milliseconds determined by a maximum bubble pressure method is higher than 47 mN/m, and the dynamic surface tension at a lifetime of 5,000 milliseconds determined by the maximum bubble pressure method is 38 mN/m or lower.

19 Claims, 6 Drawing Sheets

U.S. PATENT DOCUMENTS

| | | | | |
|---|---|---|---|---|
| 5,080,716 | A | 1/1992 | Aoki et al. | 106/20 |
| 5,131,949 | A | 7/1992 | Tochihara et al. | 106/20 |
| 5,132,700 | A | 7/1992 | Tochihara et al. | 346/1.1 |
| 5,213,613 | A | 5/1993 | Nagashima et al. | 106/20 R |
| 5,258,066 | A | 11/1993 | Kobayashi et al. | 106/22 R |
| 5,296,022 | A | 3/1994 | Kobayashi et al. | 106/20 D |
| 5,451,251 | A | 9/1995 | Mafune et al. | 106/22 H |
| 5,466,282 | A | 11/1995 | Eida et al. | 106/22 K |
| 5,571,313 | A | 11/1996 | Mafune et al. | 106/22 H |
| 5,911,815 | A | 6/1999 | Yamamoto et al. | 106/31.27 |
| 6,027,210 | A | 2/2000 | Kurabayashi et al. | 347/100 |
| 6,153,001 | A * | 11/2000 | Suzuki et al. | 106/31.65 |
| 6,174,354 | B1 | 1/2001 | Takizawa et al. | 106/31.43 |
| 6,221,141 | B1 | 4/2001 | Takada et al. | 106/31.6 |
| 6,280,513 | B1 * | 8/2001 | Osumi et al. | 106/31.6 |
| 6,332,919 | B2 | 12/2001 | Osumi et al. | 106/31.6 |
| 6,375,317 | B1 | 4/2002 | Osumi et al. | 347/100 |
| 6,412,936 | B1 | 7/2002 | Mafune et al. | 347/100 |
| 6,425,662 | B1 | 7/2002 | Teraoka et al. | 347/100 |
| 6,460,988 | B1 | 10/2002 | Mafune et al. | 347/100 |
| 6,511,534 | B1 | 1/2003 | Mishina et al. | 106/31.33 |
| 6,521,034 | B1 | 2/2003 | Osumi et al. | 106/31.6 |
| 6,547,381 | B2 | 4/2003 | Watanabe et al. | 347/100 |
| 6,702,882 | B2 | 3/2004 | Yakushigawa et al. | 106/31.27 |
| 6,706,100 | B2 | 3/2004 | Mafune et al. | 106/31.27 |
| 6,706,104 | B2 | 3/2004 | Takuhara et al. | 106/31.6 |
| 6,706,105 | B2 | 3/2004 | Watanabe et al. | 106/31.6 |
| 6,843,839 | B2 | 1/2005 | Kanke et al. | 106/31.47 |
| 6,866,380 | B2 | 3/2005 | Yakushigawa et al. | 347/100 |
| 7,005,461 | B2 | 2/2006 | Sanada et al. | 523/160 |
| 7,037,362 | B2 | 5/2006 | Honma et al. | 106/31.13 |
| 7,141,107 | B2 | 11/2006 | Honma et al. | 106/31.58 |
| 7,144,452 | B2 | 12/2006 | Takayama et al. | 106/31.52 |
| 7,160,376 | B2 | 1/2007 | Watanabe et al. | 106/31.6 |
| 7,195,664 | B2 | 3/2007 | Mafune et al. | 106/31.27 |
| 7,198,664 | B2 | 4/2007 | Mafune et al. | 106/31.28 |
| 7,198,665 | B2 | 4/2007 | Nakamura et al. | 106/31.52 |
| 7,247,196 | B2 | 7/2007 | Sato et al. | 106/31.52 |
| 7,267,717 | B2 | 9/2007 | Watanabe et al. | 106/31.6 |
| 7,276,110 | B2 | 10/2007 | Tsujimura et al. | 106/31.27 |
| 7,276,112 | B2 | 10/2007 | Tokuda et al. | 106/31.6 |
| 2003/0179268 | A1 * | 9/2003 | Koga et al. | 347/100 |
| 2003/0200897 | A1 | 10/2003 | Nakatsu et al. | 106/31.58 |
| 2004/0103815 | A1 | 6/2004 | Honma et al. | 106/31.13 |
| 2005/0005818 | A1 | 1/2005 | Sato et al. | 106/31.27 |
| 2005/0024458 | A1 * | 2/2005 | Sanada et al. | 347/100 |
| 2006/0066699 | A1 | 3/2006 | Tokuda et al. | 347/100 |
| 2006/0089424 | A1 | 4/2006 | Sanada et al. | 523/160 |
| 2006/0098067 | A1 | 5/2006 | Imai et al. | 347/100 |
| 2006/0098068 | A1 | 5/2006 | Hakamada et al. | 347/100 |
| 2006/0103703 | A1 | 5/2006 | Nito et al. | 347/100 |
| 2006/0103704 | A1 | 5/2006 | Hakamada et al. | 347/100 |
| 2006/0135647 | A1 | 6/2006 | Ichinose et al. | 523/160 |
| 2007/0097155 | A1 | 5/2007 | Imai et al. | 347/1 |
| 2007/0112095 | A1 | 5/2007 | Moribe et al. | 523/160 |
| 2007/0252881 | A1 * | 11/2007 | Sanada et al. | 347/100 |

FOREIGN PATENT DOCUMENTS

| | | |
|---|---|---|
| JP | 2516218 | 7/1996 |
| JP | 2000-198955 | 7/2000 |
| JP | 2002-167534 | 6/2002 |
| JP | 2003-231838 | 8/2003 |
| JP | 2003-238851 | 8/2003 |
| JP | 2003-277658 | 10/2003 |
| JP | 2003-321632 | 11/2003 |
| JP | 2003-3216332 | 11/2003 |
| JP | 2004-51800 | 2/2004 |
| JP | 2004-143290 | 5/2004 |
| JP | 2005-200566 | 7/2005 |
| JP | 2005-206615 | 8/2005 |
| JP | 2006-63322 | 3/2006 |
| JP | 2007-162006 | 6/2007 |
| WO | WO 2007/139171 | 12/2007 |

OTHER PUBLICATIONS

International Search Report of International Application No. PCT/JP2007/061039 dated Jul. 24, 2007.

* cited by examiner

AQUEOUS INK, INK JET RECORDING METHOD, INK CARTRIDGE, RECORDING UNIT AND INK JET RECORDING APPARATUS

CROSS-REFERENCE TO RELATED APPLICATIONS

This application is a continuation of International Application No. PCT/JP2007/061039, filed May 24, 2007 which claims the benefit of Japanese Patent Application No. 2006-145354, filed May 25, 2006 and Japanese Patent Application No. 2007-136687, filed May 23, 2007.

BACKGROUND OF THE INVENTION

1. Field of the Invention

The present invention relates to an aqueous ink, and particularly to an aqueous ink suitable for use in a recording method and a recording apparatus using an ink jet recording system.

2. Description of the Related Art

An ink used in ink jet recording systems is required to become an ink giving a high image density (OD value) for the purpose of achieving high image quality. In addition, an ink which prevents recording media from being stained even when recording is continuously conducted, i.e., an ink having excellent fixing ability, is required for the purpose of achieving speeding-up. Further, upon high-speed recording, white stripes (linked stripes) may occur at a boundary between images recorded through each one line recording of each scanning of a carriage in some cases to incur deterioration of image quality, and so improvement is required.

Various techniques have been proposed to date for the purpose of enhancing the image density. For example, the proposed techniques include a technique of using a coloring material excellent in color developing properties and a technique of properly designing the composition of an ink, thereby enhancing the association or aggregation ability of a coloring material to leave a larger amount of the coloring material on the surface of a recording medium.

It has heretofore been known that an ink containing a water-insoluble coloring material such as a pigment as a coloring material (pigment ink) provides images excellent in fastness properties such as water fastness and light fastness. In recent years, various techniques have been proposed for the purpose of more enhancing the image density of images formed with such an ink. For example, it has been proposed to use an ink containing self-dispersion type carbon black and a specific salt, thereby enhancing the image density (Japanese Patent Application Laid-Open No. 2000-198955; hereinafter referred to as Patent Document 1). In this technique, a pigment present in a dispersed state in the ink is forcedly aggregated on the surface of a recording medium, thereby inhibiting the permeation of the pigment into the recording medium to achieve a higher image density.

However, it has been found that since pigment particles are caused to aggregate on the surface of the recording medium in such prior art as mentioned above, an area of the surface of the recording medium which can be covered with the pigment with respect to the volume of ink droplets (the so-called area factor) may not be sufficient in some cases. This fact means that the amount of the ink applied, which is required to achieve the same image density, in the above-described technique increases compared with a conventional pigment ink containing a pigment dispersed by a dispersant. There has thus been room for improvement in this respect.

In addition, in such prior art as mentioned above, the amount of the ink applied is increased to require a long time for drying, so that in some cases, high-speed continuous recording may cause problems such as print-through upon the continuous recording as described below. More specifically, since the ink of a first recorded matter is not sufficiently dried (fixed) during the period from formation of the first recorded matter to discharge of a second recorded matter from an ink jet recording apparatus, the ink of the first recorded matter may adhere to the back surface of the second recording medium in some cases. Further, the above-described area factor may be insufficient in some cases for the requirement of high resolution in the ink jet recording apparatus. There has thus been room for improvement in this respect, too. Incidentally, there is a method for achieving a high area factor even with small volume ink droplets by improving the permeability of an ink into a recording medium. However, when the permeability of the ink is improved, the ink permeates not only in the surface of the recording medium, but also in the depth-wise direction of the recording medium, so that a sufficient image density may have not been achieved in some cases.

The following proposals have been made for solving such problems. For example, there is a proposal as to improvement in the image density by causing an ink containing a plurality of water-soluble organic solvents and a water-insoluble coloring material to have the following constitution, thereby aggregating a coloring material in the vicinity of the surface of a recording medium even with small volume ink droplets (Japanese Patent Application Laid-Open No. 2005-206615; hereinafter referred to as Patent Document 2). More specifically, the plurality of the water-soluble organic solvents includes a good medium and a poor medium for a self-dispersion type pigment, and a water-soluble organic solvent exhibiting a maximum Ka value among respective Ka values of the plurality of the water-soluble organic solvents as determined by the Bristow's method is a poor medium.

As techniques for controlling permeation of an ink into a recording medium and blurring of the ink, proposals paying attention to a dynamic surface tension of the ink have been made. For example, there has been a proposal to improve drying ability by an ink having the construction of [dynamic surface tension (dyn/cm) at a lifetime of 0 millisecond+viscosity (cp)]=42 to 49 (Japanese Patent Registration No. 2516218; hereinafter referred to as Patent Document 3). There is also a proposal as to an ink having a maximum value of the rate of change of the dynamic surface tension of from 0.2 mN/m/s or more to 0.4 mN/m/s or less (Japanese Patent Application Laid-Open No. 2003-238851; hereinafter referred to as Patent Document 4). There is further a proposal as to an ink having a dynamic surface tension of from 25 to 50 mN/m at a lifetime of 10 milliseconds and having a difference of 5 mN/m or less between the maximum value and the minimum value of the dynamic surface tension (Japanese Patent Application Laid-Open No. 2005-200566; hereinafter referred to as Patent Document 5). There is still further a proposal as to an ink having a dry viscosity of 100 mPa·s or less, a dynamic surface tension of 45 mN/m or less at a lifetime of 10 milliseconds and a dynamic surface tension of 35 mN/m at a lifetime of 1,000 milliseconds (Japanese Patent Application Laid-Open No. 2003-231838; hereinafter referred to as Patent Document 6).

In addition, there are the following proposals as to change in the particle size of a pigment and dispersion stability when a pigment ink containing water and a water-soluble organic solvent is evaporated. For example, there is a proposal that the increase rate of the average particle size of a pigment in a pigment ink when 30 mass % of the ink is evaporated is controlled to 25% or less (Japanese Patent Application Laid-Open No. 2002-167534; hereinafter referred to as Patent Document 7). There is also a proposal as to a pigment ink by which dispersion stability is achieved even when 50 mass % of the ink is evaporated (Japanese Patent Application Laid-Open No. 2004-143290; hereinafter referred to as Patent Document 8).

SUMMARY OF THE INVENTION

The present inventors have researched the merits and problems of conventional inks and analyzed the features of images obtained by using such inks. As a result, it has been found that the speed of an ink permeating into a recording medium and the change in state of the ink (for example, aggregation of a coloring material) after the ink is ejected from a recording head and applied to the recording medium vary according to the kind of the recording medium. Incidentally, the speed of the ink permeating into the recording medium means a speed from the time the ink starts to permeate from the surface of the recording medium toward the depth-wise direction thereof after the ink is applied to the recording medium to the time the ink becomes absent at the surface of the recording medium, not a speed when the ink diffuses in the interior of the recording medium. It has been further found that a recording medium high in the permeation speed of the ink, i.e., a recording medium having coarse texture and a lot of voids tends not to achieve a sufficient image density.

In other words, it is a main object of the prior art for achieving a high image density to control the state of a coloring material. Therefore, when an ink which causes aggregation of the coloring material with the permeation into a recording medium is applied to a recording medium high in the permeation speed, a sufficient image density may not be achieved in some cases, because the aggregation of the coloring material does not sufficiently take place. Accordingly, it is an object to achieve a high image density by causing a greater amount of a coloring material to be present on the surfaces of various kinds of recording media.

There is also a technique for enhancing an image density by holding down the permeation speed of an ink into a recording medium to cause a great amount of a coloring material to be present on the surface of the recording medium. However, when a recording medium having particularly fine texture and a small amount of voids is used, the fixing ability of the ink cannot be satisfied even when such a technique as described above is used. In other words, it is another object to improve the fixing ability of the ink for various kinds of recording media.

For a recording medium high in the permeation speed of an ink, a high image density can be achieved by properly designing the composition of the ink to inhibit the permeation of the ink into the recording medium. However, when an ink having such a composition is used, it takes a long time to dry (fix) the ink when an image is formed on a recording medium low in the permeation speed of the ink, so that such an ink may not cope with high-speed continuous recording in some cases.

On the other hand, to the contrary, there is also a method, in which the aggregating rate of a coloring material in an ink is made high while keeping high permeation speed of the ink, thereby causing the coloring material to be present on the surface of the recording medium. According to this method, however, the aggregation of the coloring material is not sufficiently conducted while the ink permeates into the recording medium for a recording medium high in the permeation speed, so that a sufficient image density may not be achieved in some cases. In addition, since the permeation of the ink starts right after the ink is applied to the recording medium, the coloring material diffuses in the interior of the recording medium though the coloring material permeating in the depth-wise direction of the recording medium decreases, so that a sufficient image density may not be achieved in some cases.

In order to cope with these problems, it is conducted to bring a specific relationship between a water-insoluble coloring material and a plurality of water-soluble organic solvents, specifically, use a water-soluble organic solvent having a maximum Ka value as determined by the Bristow's method as a poor medium for the water-insoluble coloring material as described in Patent Document 2. It is said that the coloring material can thereby be effectively diffused and aggregated in the vicinity of a recording medium even by small volume ink droplets to achieve a sufficient image density.

According to this method, however, the coloring material is aggregated while being diffused in the vicinity of the surface of the recording medium after the ink is applied to the recording medium. Therefore, the aggregation of the coloring material becomes insufficient at an initial stage of the diffusion, so that a coloring material undergoing no aggregation at the point of time the ink starts to diffuse diffuses in the depth-wise direction of the recording medium. As a result, when a recording medium high in the permeation speed of the ink has been used, a high image density has not been achieved in some cases. This fact means that when surface condition and wetting ability to an ink vary between recording media, the permeation speed and diffusing rate of the ink vary according to recording media. When an image is formed on a recording medium high in the permeation speed of the ink, the aggregation of a coloring material cannot follow the permeation and diffusion of the ink, so that the coloring material in the ink permeates in the depth-wise direction of the recording medium. As a result, such a problem that a sufficient image density is not achieved according to the kinds of recording media is caused.

The present inventors have analyzed the mechanism of the formation of an image and paid attention to finding of dominant technical factors capable of solving the above problems. As a result, it has been found that it is important to suitably control aggregation of a coloring material in a recording medium and the behavior of an ink from application to the recording medium to completion of permeation. In other words, it is important to find novel conditions of physical properties of an ink for achieving a high image density for a recording medium having coarse texture and a lot of voids, i.e., a recording medium high in permeation speed, by efficiently using a coloring material in the formation of an image.

It is accordingly an object of the present invention to provide an aqueous ink having such excellent properties that both image density and fixing ability are excellent irrespective of the kind of a recording medium even when the volume of an ink droplet is small and that white stripes are not caused even when high-speed recording is conducted. Another object of the present invention is to provide an ink jet recording method, an ink cartridge, a recording unit and an ink jet recording apparatus using such an aqueous ink.

The present inventors have carried out an investigation as to the behavior of evaporation and permeation of an ink on a recording medium. As a result, it has been found that the following conditions are required to cause a coloring material to be effectively present on the surface of a recording medium. Namely, it is necessary to keep high the dynamic surface tension of an ink for a period of time from the application of the ink to a recording medium to the occurrence of such a change in state of the ink (viscosity increase of the ink, association or aggregation of a coloring material) that an image density can be enhanced, so as to prevent the ink from permeating into the recording medium. It has thus been found that it is necessary to keep the dynamic surface tension of the ink higher than 47 mN/m at a lifetime of 50 milliseconds. The present inventors have also found that it is necessary to greatly lower the dynamic surface tension with changes in the lifetime, specifically, greatly change the value of the dynamic surface tension between the lifetime of 50 milliseconds and the lifetime of 5,000 milliseconds for making both image density and fixing ability excellent.

The above objects can be achieved by the present invention described below. More specifically, the aqueous ink according to the present invention is an aqueous ink comprising at least water, a water-soluble organic solvent, a water-insoluble coloring material, a surfactant and a poor medium for the water-insoluble coloring material and/or a salt, wherein a dynamic surface tension of the aqueous ink at a lifetime of 50 milliseconds determined by a maximum bubble pressure method is higher than 47 mN/m, and a dynamic surface tension at a lifetime of 5,000 milliseconds determined by the maximum bubble pressure method is 38 mN/m or lower.

The ink jet recording method according to another embodiment of the present invention is an ink jet recording method comprising ejecting an ink by an ink jet system, wherein the ink is the above-described aqueous ink.

The ink cartridge according to a further embodiment of the present invention is an ink cartridge comprising an ink storage portion storing an ink, wherein the ink stored in the ink storage portion is the above-described aqueous ink.

The recording unit according to a still further embodiment of the present invention is a recording unit comprising an ink storage portion storing an ink and a recording head for ejecting the ink, wherein the ink stored in the ink storage portion is the above-described aqueous ink.

The ink jet recording apparatus according to a yet still further embodiment of the present invention is an ink jet recording apparatus comprising an ink storage portion storing an ink and a recording head for ejecting the ink, wherein the ink stored in the ink storage portion is the above-described aqueous ink.

According to the present invention, it is possible to provide an aqueous ink having such excellent properties that both image density and fixing ability are excellent irrespective of the kind of a recording medium even when the volume of an ink droplet is small and that white stripes are not caused even when high-speed recording is conducted. According to other embodiments of the present invention, it is possible to provide an ink jet recording method, an ink cartridge, a recording unit and an ink jet recording apparatus using the aqueous ink.

Further features of the present invention will become apparent from the following description of exemplary embodiments (with reference to the attached drawings).

DESCRIPTION OF THE EMBODIMENTS

Figure 1:
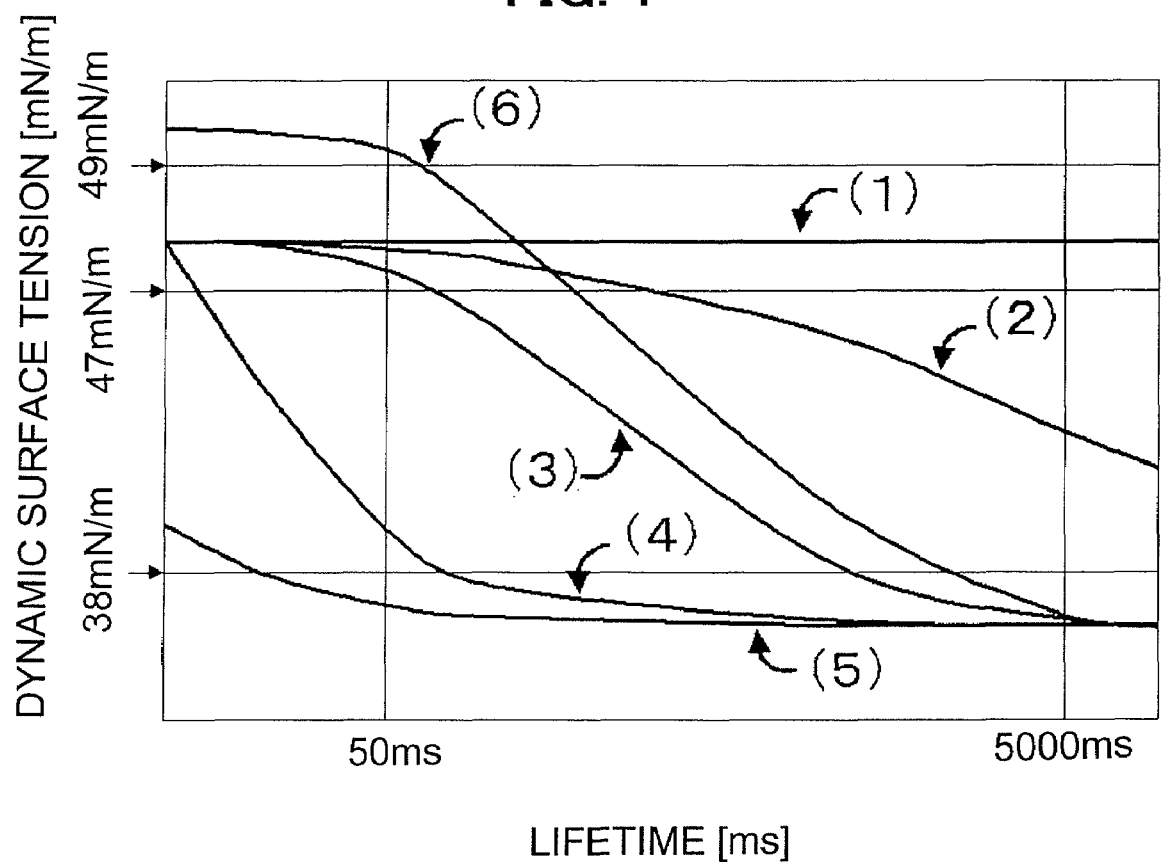
FIG. 1 illustrates examples of a state that the dynamic surface tension of an ink changes.

The present invention will hereinafter be described in more detail by the best mode for carrying out the invention. Incidentally, the aqueous ink may be referred to as "the ink" in the following description. The poor solvent for the water-insoluble coloring material may also be referred to as "the poor solvent" merely. Although the salt is present in the form dissociated into ions in the ink, representation as "containing the salt" is used for the sake of convenience. The permeation speed in the present invention means a time from the time an ink starts to permeate from the surface of a recording medium toward the depth-wise direction thereof after the ink is applied to the recording medium to the time the ink becomes absent at the surface of the recording medium. This indicates a phenomenon concerning a time during which the ink is present at the surface of the recording medium, not a time until the diffusion of the ink is completed in the interior of the recording medium. Such a phenomenon can be confirmed by observing the state from the time the ink (one dot) is ejected from a recording head and applied to the recording medium to the time the droplet of the ink becomes absent at the surface of the recording medium, from a lateral direction of the recording medium by means of a high-speed camera and the like.

Technical Idea of the Present Invention and Difference from the Prior Art

The first technical idea of the present invention is to keep the dynamic surface tension of an ink at a certain value or more in a period of time from the application of the ink to a recording medium to the occurrence of a change in state of the ink (viscosity increase of the ink, association or aggregation of a coloring material) caused by a poor medium and/or a salt in the ink due to evaporation of the ink. The permeation of the ink into the recording medium is thereby inhibited, and the aggregation of the coloring material is controlled meanwhile, whereby the coloring material can be caused to be effectively present on the surface of the recording medium.

The second technical idea of the present invention is to lower the surface tension of an ink to a certain value until the time a certain period of time has elapsed from the application of the ink to a recording medium. The fixing ability of the ink can be thereby improved.

The third technical idea of the present invention is to lower the dynamic surface tension of an ink to a certain value or lower in a period of time from the application of the ink to a recording medium to the occurrence of a change in state of the ink. The surface tension of the ink can be thereby kept excessively high to inhibit the aggregation of the water-insoluble coloring material from proceeding in excess before the ink appropriately diffuses in the recording medium. As a result, white stripes caused by an insufficient area of the surface of the recording medium covered with the coloring material (the so-called area factor), particularly, white stripes markedly caused upon high-speed recording (one-pass recording or the like) can be inhibited. Incidentally, the one-pass recording means a recording method that a recording head obtained by arranging a plurality of ejection orifices for ejecting an ink in a feeding direction of the recording medium (sub scanning direction) is used to form an image by one main scanning in a forward direction or a return direction of a recording operating direction (main scanning direction). In addition to the above-described recording head, a recording head obtained by arranging plural groups of ejection orifices for ejecting a plurality of different inks (for example, color inks) in the recording operating direction (main scanning direction) may be further used in combination, as needed, to conduct the one-pass recording. The one-pass recording is conducted, and the ejection orifices arranged in the sub scanning direction are used as much as possible in one main scanning, whereby recording can be conducted in less scanning times, i.e., at high speed.

Some proposals as to inks paying attention to the dynamic surface tension as in Patent Documents 3 to 6 have been made to date. However, even in the techniques of these proposals, any investigation as to what change in state the coloring material causes in the process from the application of the ink to a recording medium to the permeation of the ink is not made at all. In other words, since the inventions described in Patent Documents 3 to 6 do not consider a phenomenon occurring in the recording medium, the high image density sought by the present inventors cannot be achieved by the mere definition of physical properties of the ink in these articles.

For example, the inventions described in Patent Documents 3 and 4 are technique relating to how to lower the surface tension of an ink during a short lifetime to enhance the permeability. In these techniques, however, there is no consideration about what influence the dynamic surface tension right after the ink is applied to the recording medium exerts on the formation of an image. In the invention described in Patent Document 4 in particular, the rate of change with time in the dynamic surface tension is low, so that it is difficult to satisfy both image density and fixing ability to various kinds of recording media. Therefore, even when the inks described in Patent Documents 3 and 4 are used, it is considered to be impossible to achieve the above-described objects of the present invention.

On the other hand, the inventions described in Patent Document 5 and 6 define the dynamic surface tension at a lifetime of 10 milliseconds and varied values of the dynamic surface tension. Thus, the present inventors have prepared an ink satisfying the conditions described in Patent Documents 5 and 6 and investigated the image density achieved by the ink. As a result, it has been found that the image density of the level sought by the present inventors is not achieved. The reason for it is considered to be attributable to the fact that the evaporation of the ink scarcely takes place at a lifetime of 10 milliseconds, and so such a change in state of the ink (viscosity increase of the ink, association or aggregation of a coloring material) that the image density can be enhanced on a recording medium does not occur. In other words, in the technique described in Patent Documents 5 and 6, the change in state of the ink on the recording medium is not considered at all, and the value of the dynamic surface tension at a lifetime of 10 milliseconds may be considered to be a value making no sense for enhancement of the image density.

The value of 45 mN/m of the dynamic surface tension at a lifetime of 10 milliseconds in Patent Document 4 is too low to inhibit the permeation of the ink into the recording medium having coarse texture and a lot of voids. Even from this point of view, the object of the technique described in Patent Document 4 is to control the permeation speed of an ink to achieve appropriate permeability without over-blurring. It may thus be said that a high image density cannot be achieved.

Means for Solving the Problem

The ink according to the present invention is an ink comprising at least water, a water-soluble organic solvent, a water-insoluble coloring material, a surfactant and a poor medium for the water-insoluble coloring material and/or a salt, and having the following characteristics as to the dynamic surface tension. More specifically, a dynamic surface tension at a lifetime of 50 milliseconds determined by a maximum bubble pressure method is higher than 47 mN/m, and a dynamic surface tension at a lifetime of 5,000 milliseconds determined by the maximum bubble pressure method is 38 mN/m or lower.

Incidentally, the maximum bubble pressure method used in the measurement of the dynamic surface tension in the present invention is as follows. Specifically, the maximum bubble pressure method is such a method that a maximum pressure required to release a bubble formed at a tip portion of a probe (capillary) dipped in a liquid to be measured is measured, and a surface tension is found from this maximum pressure. The lifetime means a time, upon formation of a bubble at the tip portion of the probe in the maximum bubble pressure method, from a point of time at which a surface of a new bubble has been formed after a bubble has been released from the tip portion to a point of time at which a maximum bubble pressure has been reached (a point of time a curvature radius of the bubble becomes equal to a radium of the tip portion of the probe).

The point of the present invention is to achieve both image density and fixing ability by precisely controlling a balance between two phenomena of the aggregation of the water-insoluble coloring material and the permeation of the ink into the recording medium. To do so, it is important to balance the aggregation of the water-insoluble coloring material, which is caused by a change in the ratio of the components in the ink due to evaporation of the ink or wetting of the recording medium with the ink, with the starting time of the permeation caused by a change in the dynamic surface tension of the ink.

What influence the dynamic surface tension value at a lifetime of 50 milliseconds exerts on the image properties such as image density and fixing ability will hereinafter be described.

FIG. 1 illustrates examples of a state that the dynamic surface tension of an ink changes. In FIG. 1, an ink (1) is an ink that keeps a dynamic surface tension higher than 47 mN/m through the time change. Inks (2) and (3) are inks that have a dynamic surface tension at a lifetime of 50 milliseconds of higher than 47 mN/m, wherein the dynamic surface tension lowers with the time change. In these inks, the dynamic surface tension of the ink (3) more greatly changes with the time change and the dynamic surface tension at a lifetime of 5,000 milliseconds becomes 38 mN/m or lower. An ink (4) is an ink that has a dynamic surface tension of higher than 47 mN/m at an extremely short lifetime, but the dynamic surface tension greatly changes with the time change, whereby the dynamic surface tension at a lifetime of 50 milliseconds becomes 47 mN/m or lower, and the dynamic surface tension lowers with the time change even after this. An ink (5) is an ink that has a low dynamic surface tension even from an extremely short lifetime, and the dynamic surface tension lowers with the time change even after this. An ink (6) is an ink containing neither a poor medium for a water-insoluble coloring material nor a salt.

The respective inks having such characteristics of change of dynamic surface tension as described above are different from one another in terms of the states of the inks on a recording medium at the point of the lifetime of 50 milliseconds. The inks (1), (2) and (3) in FIG. 1 have dynamic surface tensions at a lifetime of 50 milliseconds higher than 47 mN/m. When the dynamic surface tension at a lifetime of 50 milliseconds is higher than 47 mN/m, the initiation of permeation of such an ink into a recording medium can be inhibited even when the recording medium is a recording medium having coarse texture and a lot of voids, i.e., a recording medium high in permeation speed. In this case, the ink contains a poor medium for the water-insoluble coloring material and/or a salt, whereby a high image density can be achieved because a change in state of the ink, such as aggregation of the water-insoluble coloring matter attending on the evaporation of water in the ink, takes place. According to the investigation by the present inventors, this is considered to be attributable to the following mechanism. Namely, the dynamic surface tension of an ink is kept higher than 47 mN/m at a time when such a change in state of the ink (viscosity increase of the ink) that the image density can be enhanced occurs, i.e., at the time 50 milliseconds have elapsed from the application of the ink to a recording medium. Water in the ink on the recording medium thereby evaporates to cause the change in state of the ink (viscosity increase of the ink), so as to change the composition of the ink. As a result, the concentration of the poor medium for the water-insoluble coloring material and/or the salt in the ink changes, thereby causing the aggregation of the water-insoluble coloring material. The water-insoluble coloring material can be thereby caused to be effectively present on the surface of the recording medium. According to the mechanism described above, an ink having properties like the inks (1), (2) and (3) can achieve high image density even on a recording medium having coarse texture and a lot of voids, i.e., a recording medium high in permeation speed.

On the other hand, the dynamic surface tensions of the inks (4) and (5) are 47 mN/m or lower before 50 milliseconds elapse from the application of the inks to a recording medium. When an ink having such properties is applied to a recording medium low in permeation speed, the aggregation of the water-insoluble coloring material takes place with the permeation because the ink slowly permeates into the recording medium, so that the water-insoluble coloring material can be caused to be present in the vicinity of the surface of the recording medium. When the ink having such properties is applied to a recording medium having coarse texture and a lot of voids, i.e., having high permeation speed, however, permeation of the ink into the recording medium starts before a change in state of the ink (viscosity increase of the ink, association or aggregation of a coloring material) occurs. As a result, the water-insoluble coloring material cannot be caused to be effectively present on the surface of the recording medium. In other words, in an ink having properties like the inks (4) and (5), the permeation speed is higher than the aggregation speed when a recording medium having coarse texture and a lot of voids, i.e., a recording medium high in permeation speed, is used, so that the water-insoluble coloring material comes to permeate into recording medium, and so the image density becomes low.

Incidentally, the ink (6) contains neither the poor medium for the water-insoluble coloring material nor the salt. When such an ink is applied to a recording medium having coarse texture and a lot of voids, i.e., having high permeation speed, it is necessary that the dynamic surface tension of the ink at a lifetime of 50 milliseconds is 49 mN/m or more for achieving a high image density.

As described above, when an ink contains neither a poor medium for the water-insoluble coloring material nor a salt, it is necessary that the dynamic surface tension of the ink is controlled as follows for achieving a high image density even for a recording medium having coarse texture and a lot of voids, i.e., a recording medium high in permeation speed. Namely, it is necessary that the dynamic surface tension of the ink at a lifetime of 50 milliseconds is controlled to 49 mN/m or more. On the other hand, when an ink contains a poor medium for the water-insoluble coloring material and/or a salt, it is only necessary that the dynamic surface tension of the ink at a lifetime of 50 milliseconds is made higher than 47 mN/m. By providing an ink having such constitution, a high image density can be achieved even for a recording medium having coarse texture and a lot of voids, i.e., a recording medium high in permeation speed. This means that the ink containing the poor medium and/or the salt can achieve a high image density even when the dynamic surface tension of the ink at a lifetime of 50 milliseconds determined by the maximum bubble pressure method is low compared with an ink containing neither the poor solvent nor the salt In order to improve the fixing ability of an ink, i.e., to accelerate the fixing speed thereof, it is preferable that the dynamic surface tension of the ink be lowered with time change. Specifically, it is necessary that the dynamic surface tension of the ink at a lifetime of 5,000 milliseconds determined by the maximum bubble pressure method be 38 mN/m or lower. The reason for it is that when the dynamic surface tension of the ink at a lifetime of 5,000 milliseconds is 38 mN/m or lower, the speed of permeating into a recording medium of an excessive liquid component present on the surface of the recording medium can be increased even when the recording medium has fine texture and a small amount of voids, and so the fixing speed can be made high. Accordingly, among the inks (1), (2) and (3) in FIG. 1, by which high image density can be achieved, the ink (3), whose dynamic surface tension at a lifetime of 5,000 milliseconds is 38 mN/m or lower, is required for the purpose of increasing the fixing speed.

Incidentally, when the dynamic surface tension at a lifetime of 5,000 milliseconds is too low, such an ink easily permeates in the interior of a recording medium (thicknesswise direction of a recording medium), so that the so-called strike-through that the ink passes through until the back surface of the recording medium may occur in some cases. Therefore, it is favorable that the dynamic surface tension at a lifetime of 5,000 milliseconds be controlled to 28 mN/m or more, further favorably 32 mN/m or more. Needless to say, the present invention is not limited thereto.

In order to achieve a high image density and provide a high-quality image free from the occurrence of white stripes, it is favorable that the dynamic surface tension of the ink at a lifetime of 50 milliseconds is controlled to 53 mN/m or lower. When the dynamic surface tension of the ink at a lifetime of 50 milliseconds exceeds 53 mN/m, such an ink may not sufficiently spread on a recording medium in some cases in a short period of time from right after the ink applied to the recording medium to the beginning of permeation of the ink into the recording medium. Therefore, white stripes (linked stripes) may occur in some cases because the recording medium cannot be efficiently covered with the ink. The white stripes (linked stripes) mean white stripes occurred at a linked portion between a recorded area with the N-th scanning and that with the (N+1)-th scanning in the one-pass recording as described above and are different from conventionally known white stripes caused by deviation of impact positions due to ejection failure. The reason why the white stripes can be inhibited by controlling the dynamic surface tension of the ink at a lifetime of 50 milliseconds to 53 mN/m or lower is not clearly known. However, the present inventors presume that the following two factors form the cause of the occurrence of the white stripes.

First, an ink whose dynamic surface tension at a lifetime of 50 milliseconds is higher than 50 mN/m shows a tendency for a plurality of ink droplets adjacently applied to recording medium to gather around each other. Therefore, an ink present at an end portion of an area recorded by a first recording pass is attracted to a central portion rich in the ink. Likewise, an ink present at an end portion of an area recorded by the next recording pass is also attracted to a central portion rich in the ink. As a result, it is considered that a white stripe occurs between the end portion of the area recorded by the first recording pass and the end portion of the area recorded by the next recording pass. It is thus favorable that the dynamic surface tension of the ink at a lifetime of 50 milliseconds is controlled to 53 mN/m or lower.

It is also considered that it takes a time of 50 milliseconds or more from the application of the ink to the recording medium to the permeation of the ink. When the aggregation of the water-insoluble coloring material and viscosity increase of the ink progress in excess meanwhile, the diffusion of the water-insoluble coloring material on the recording medium is inhibited in excess, and so a sufficient area factor cannot be achieved. As a result, it is considered that a portion on which recording is not conducted locally occurs at a linked portion between areas recorded by a plurality of recording passes to cause white stripes.

<Ink>

The ink according to the present invention is mainly characterized in that the ink has the characteristics of dynamic surface tension as described above and contains a poor medium for a water-insoluble coloring material and/or a salt. The control of the dynamic surface tension of the ink can be made by, for example, suitably combining the kinds and contents of penetrants, for example, a surfactant and a water-soluble organic solvent. It is only necessary for the ink according to the present invention to adopt the same constitution as that of a conventional ink except for the above-described condition. The respective components making up the ink according to the present invention will hereinafter be described.

(Surfactant)

No particular limitation is imposed on the surfactant so far as the ink according to the present invention is controlled so as to exhibit such a change in dynamic surface tension as described above. The content (mass %) of the surfactant in the ink is favorably from 0.10 mass % or more to 0.75 mass % or less based on the total mass of the ink. If the content is less than 0.10 mass %, it may be difficult in some cases to lower the dynamic surface tension of the ink at a lifetime of 5,000 milliseconds to 38 mN/m or lower. If the content exceeds 0.75 mass % on the other hand, it may be difficult in some cases to raise the dynamic surface tension of the ink at a lifetime of 50 milliseconds higher than 47 mN/m. Further, if the content of the surfactant is too much, the surfactant excessively present in the ink exerts an influence on the dispersion characteristics and aggregation characteristics of a pigment when the pigment is used as a water-insoluble coloring material, and so a change in state of the ink by evaporation or the like may occur in some cases. As the surfactant, may be specifically used, for example, the following surfactants.

[Nonionic Surfactant]

Polyoxyethylene alkyl ethers, polyoxyethylene fatty acid esters, polyoxyethylene alkyl phenyl ethers, polyoxyethylene-polyoxypropylene block copolymers, fatty acid diethanolamides, acetylene glycol-ethylene oxide adducts and acetylene glycol surfactants.

[Anionic Surfactant]

Polyoxyethylene alkyl ether sulfate salts, polyoxyethylene alkyl ether sulfonates, polyoxyethylene alkyl phenyl ether sulfate salts, polyoxyethylene alkyl phenyl ether sulfonates, alpha-sulfo-fatty acid ester salts, alkylbenzene sulfonates, alkyl phenolsulfonic acid salts, alkyl naphthalenesulfonic acid salts, alkyl tetralinsulfonic acid salts and dialkyl sulfosuccinic acid salts.

[Cationic Surfactant]

Alkyltrimethylammonium salts and dialkyldimethylammonium chlorides.

[Amphoteric Surfactant]

Alkylcarboxybetaines.

[Other Surfactants]

Fluorine-containing surfactants and silicone surfactant.

In order to allow the ink according to the present invention to have the characteristics of dynamic surface tension as described above, the dynamic surface tension is controlled by using one or more surfactants among the surfactants mentioned above. In the present invention, among the above-mentioned surfactants, nonionic surfactants are favorably used, and polyoxyethylene alkyl ethers are more favorably used. Polyoxyethylene alkyl ethers containing an alkyl group having 12 to 18 carbon atoms are particularly favorable. Among others, nonionic surfactants whose alkyl group is a lauryl group, cetyl group or oleyl group are particularly favorable.

In the present invention, a surfactant whose HLB value as determined by the Griffin method is from 8.0 or more to 15.5 or less, favorably from 9.0 or more to 14.0 or less, particularly favorably from 9.0 or more to 13.6 or less is favorably used. If the HLB value of the surfactant is less than 8.0, the solubility of such a surfactant in water is low, and so the surfactant is hard to be dissolved in an ink, and the surfactant may be uniformly distributed on the surface of an ink droplet in some cases. If the HLB value of the surfactant exceeds 15.5 on the other hand, the change of the dynamic surface tension in the resulting ink becomes small, and so the effect of the present invention may not be sufficiently achieved in some cases.

<Aqueous Medium>

An aqueous medium which is a mixed solvent of water and a water-soluble organic solvent may be used in the ink according to the present invention. In the present invention, it is favorable on selection of the water-soluble organic solvent that after a poor medium for the water-insoluble coloring material is determined by the following method, the water-soluble organic solvent is selected and suitably incorporated to prepare an ink. No particular limitation is imposed on the water-soluble organic solvent so far as the ink according to the present invention is controlled so as to exhibit such a change in dynamic surface tension as described above. The content (mass %) of the water-soluble organic solvents including a water-soluble organic solvent exhibiting the behavior as the poor medium, which will be described subsequently, in the ink is favorably from 3.0 mass % or more to 50.0 mass % or less based on the total mass of the ink. For example, the following water-soluble organic solvents may be specifically used.

Alkanols having 1 to 6 carbon atoms, such as ethanol, isopropanol, n-butanol, isobutanol, secondary butanol and tertiary butanol; carboxylic acid amides such as N,N-dimethylformamide and N,N-dimethylacetamide; ketones such as acetone, methyl ethyl ketone and 2-methyl-2-hydroxypentan-4-on; cyclic ethers such as keto-alcohol, tetrahydrofuran and dioxane; glycerol; glycols such as ethylene glycol, diethylene glycol, triethylene glycol, tetraethylene glycol, 1,2- or 1,3-propylene glycol, 1,2- or 1,4-butylene glycol, polyethylene glycol and thiodiglycol; polyhydric alcohols such as 1,3-butanediol, 1,5-pentanediol, 1,2-hexanediol, 1,6-hexanediol, 2-methyl-1,3-propanediol and 1,2,6-hexanetriol; alkyl ethers of polyhydric alcohols, such as ethylene glycol monomethyl (or ethyl)ether, diethylene glycol monomethyl (or ethyl)ether and triethylene glycol monoethyl (or butyl)ether; heterocyclic compounds such as n-pyrrolidone, N-methyl-2-pyrrolidone, 1,3-dimethyl-2-imidazolidinone and N-methylmorpholine; and sulfur-containing compounds such as dimethyl sulfoxide.

Among the above-described solvents, glycerol, ethylene glycol, diethylene glycol, triethylene glycol and 2-pyrrolidone are particularly favorably used. Alcohols such as ethanol, 2-propanol, 1,2-pentanediol and 1,2-hexanediol, and alkylene glycols, which are water-soluble organic solvents having high permeability, are particularly favorably used.

In order to allow the ink according to the present invention to have the characteristics of dynamic surface tension as described above, the dynamic surface tension of the ink may be controlled by using one or more water-soluble organic solvents among the water-soluble organic solvents mentioned above.

In the present invention, it is favorable that after poor medium for the water-insoluble coloring material and good medium are determined by the following method, the ratio of X and Y, when X is the total content (mass %) of good medium(s) and Y is the total content (mass %) of poor medium(s), in the ink is controlled in the following manner. Namely, the kinds and contents of water-soluble organic solvents making up the ink are favorably adjusted in such a manner that the mass ratio of X to Y [(the total content (mass %) of good medium(s)):(the total content (mass %) of poor medium(s))] falls within a range of from X:Y=10:5 or more to X:Y=10:30 or less. Incidentally, [the ratio of X to Y falls within a range of from X:Y=10:5 or more to X:Y=10:30 or less] means that when X is 10, Y is from 5 or more to 30 or less.

As water, there is favorably used deionized water (ion-exchanged water). The content (mass %) of water in the ink is favorably from 50.0 mass % or more to 95.0 mass % or less based on the total mass of the ink for the purpose of providing such an ink as to have a viscosity proper for being stably ejected and to be inhibited from clogging at an orifice.

(Poor Medium for Water-Insoluble Coloring Material and/or Salt)

The ink according to the present invention is required to contain a poor medium for the water-insoluble coloring material and/or a salt as an aggregation accelerator. The aggregation accelerator in the present invention has an action of accelerating aggregation of the water-insoluble coloring material when evaporation of the ink or a change in wetting ability occurs though being stably present in the ink during a condition where evaporation of the ink or a change in wetting ability does not occur. Specifically, the poor medium and salt have an action of accelerating aggregation of the water-insoluble coloring material when a change in the ratio of the components making up the ink take place by evaporation of the ink after the ink is ejected or by a change in the wetting ability of a recording medium after the ink is applied to the recording medium occurs.

In the present invention, the ink whose dynamic surface tension varies with lifetime contains the aggregation accelerator, whereby a high image density can be achieved by a mechanism described below. When the ink according to the present invention is applied to a recording medium, a change in state of the ink occurs by aggregation of the water-insoluble coloring material owing to the action of the aggregation accelerator, whereby the permeation of the ink into the recording medium can be inhibited even when the recording medium is a recording medium having coarse texture and a lot of voids, i.e., a recording medium high in permeation speed. In other words, the water-insoluble coloring material is aggregated by the action of the aggregation accelerator, i.e., the state in the ink is changed during from the application of the ink to the recording medium to the occurrence of permeation of the ink. As a result, the permeation speed of the ink into the recording medium can be inhibited even when the recording medium is a recording medium having coarse texture and a lot of voids, i.e., a recording medium high in permeation speed. The permeation of the ink into the recording medium starts after the water-insoluble coloring material in the ink is aggregated on the surface of the recording medium, whereby the water-insoluble coloring material in the ink can be caused to be more efficiently present on the surface of the recording medium. In other words, it is a point of the present invention to use the aggregation accelerator for surely starting the aggregation of the water-insoluble coloring material during from the application of the ink to the recording medium to the occurrence of permeation of the ink, i.e., during the presence of the ink on the surface of the recording medium.

Specific examples of the aggregation accelerator used in the present invention include poor media for the water-insoluble coloring material and salts. As described above, the aggregation accelerator has an action of accelerating aggregation of the water-insoluble coloring material when evaporation of the ink or a change in wetting ability occurs though being stably present in the ink during a condition where evaporation of the ink or a change in wetting ability does not occur. The poor medium for the water-insoluble coloring material and the salt will hereinafter be described.

[Poor Medium for the Water-Insoluble Coloring Material]

The poor medium in the present invention means such a water-soluble organic solvent that the dispersed state of the water-insoluble coloring material in the water-soluble organic solvent cannot be stably kept irrespective of the dispersing method of the water-insoluble coloring material. In the present invention, a water-soluble organic solvent exhibiting the behavior as the poor medium as described above is used as the aggregation accelerator for the water-insoluble coloring material, and the content of the poor medium in the ink (in a state without evaporation) is preset in such a manner that the water-insoluble coloring material can be stably dispersed. When such an ink is applied to a recording medium, the concentration of the poor medium relatively increases in the process of the ink evaporation. The content of the poor medium in the ink is favorably set to the extent that the water-insoluble coloring material can starts aggregating at this time. In the present invention, the water-soluble organic solvent acting as the poor medium for the water-insoluble coloring material is used after dispersion stability for an objective water-insoluble coloring material is determined in the following manner. Incidentally, a water-soluble organic solvent, which is not a poor medium, is referred to as a good medium in the present invention.

More specifically, whether a water-soluble organic solvent used is a good medium or a poor medium for a certain water-insoluble coloring material was determined by the following method. First, the following two dispersion liquids of a dispersion liquid A of a certain water-insoluble coloring material containing a water-soluble organic solvent, which is an object of determination, and a dispersion liquid B of the water-insoluble coloring material are prepared.

A: A dispersion liquid having a composition in which the content of the water-soluble organic solvent, which is the object of determination, is 50 mass %, the content of the water-insoluble coloring material or the total content of the water-insoluble coloring material and a substance contributing to the dispersion of the coloring material is 5 mass %, and the content of water is 45 mass %.

B: A dispersion liquid having a composition in which the content of the water-insoluble coloring material or the total content of the water-insoluble coloring material and a substance contributing to the dispersion of the coloring material is 5 mass %, and the content of water is 95 mass %.

After the dispersion liquid A is preserved for 48 hours at 60° C. and then cooled to ordinary temperature, the average particle size of the water-insoluble coloring material in the dispersion liquid A is measured by means of a fiber-optics particle analyzer (trade name: FPAR-1000; manufactured by Otsuka Electronics Co., Ltd.). Further, after the dispersion liquid B is preserved for 48 hours at 60° C. in the same manner as described above and then cooled to ordinary temperature, the average particle size of the water-insoluble coloring material in the dispersion liquid B is measured by means of the fiber-optics particle analyzer. The values of the average particle sizes of the respective water-insoluble coloring materials in the dispersion liquid A and the dispersion liquid B are regarded as a particle size (A) and a particle size (B), respectively. At this time, the water-soluble organic solvent is determined to be a poor medium where the particle size (A) is larger than the particle size (B), or to be a good medium where the particle size (A) is equivalent to or smaller than the particle size (B).

The poor medium determined in such a manner was used to prepare an ink having the constitution defined in the present invention. As a result, it was confirmed that such an excellent effect as described above is achieved.

Whether an ink, whose composition is unknown, corresponds to the present invention or not can be easily confirmed by using a method described below. First, the kinds and contents of water-soluble organic solvents contained in the ink, whose composition is unknown, are analyzed by gas chromatography (GC/MS). Specifically, a sample obtained by taking out 1 g of an ink, whose composition is unknown, and diluting the ink to a prescribed dilution with methanol is analyzed by means of GC/MS (trade name: TRACE DSQ; manufactured by Thermo Quest). The kinds and contents of water-soluble organic solvents contained in the aqueous medium can be thereby identified.

It is then necessary to determine whether the water-soluble organic solvents identified are good medium or poor medium. According to the above-described method for determining the good medium and the poor medium, a dispersion liquid is prepared by dispersing a self-dispersing pigment in a liquid containing a water-soluble organic solvent and water. In order to prepare such a dispersion liquid from an ink, it is necessary to extract from the ink a water-insoluble coloring material or a water-insoluble coloring material and a substance contributing to dispersion of the coloring material. In this case, however, the water-insoluble coloring material or the water-insoluble coloring material and the substance contributing to the dispersion thereof may possibly be denatured in the process of the extraction treatment.

Thus, the present inventors have carried out an investigation as to a method for determining a poor medium and a good medium using an ink itself, whose composition is unknown, by which the determined result is coincide with that of the above-described method for determining the good medium and the poor medium. As a result, it has been found that the following method can be applied to a method for determining a poor medium and a good medium using an ink itself, whose composition is unknown.

A water-soluble organic solvent in an ink, which was identified in the above-described manner, is added in an amount equal to the content of the water-soluble compound in the ink to prepare a dilute liquid. This dilute liquid is preserved for 48 hours at 60° C. and cooled to ordinary temperature, and the average particle size of a water-insoluble coloring material in the dilute liquid is measured by means of a fiber-optics particle analyzer (trade name: FPAR-1000; manufactured by Otsuka Electronics Co., Ltd.) or the like. Further, the average particle size of the water-insoluble coloring material in an ink in a state not preserved for 48 hours at 60° C. is also measured in the same manner as described above. The values of the average particle sizes of the respective water-insoluble coloring materials in the dilute liquid preserved for 48 hours at 60° C. and the ink in the state not preserved for 48 hours at 60° C. are regarded as a particle size (A) and a particle size (B), respectively. At this time, the water-soluble organic solvent is determined to be a poor medium where the particle size (A) is larger than the particle size (B), or to be a good medium where the particle size (A) is equivalent to or smaller than the particle size (B).

The content (mass %) of the poor medium in the ink is favorably from 3.0 mass % or more to less than 50.0 mass %, more favorably from 10.0 mass % or more to 40.0 mass % or less based on the total mass of the ink. If the content is less than 3.0 mass %, the effect to aggregate the water-insoluble coloring material by the poor medium is not brought about, so that a greater amount of the water-insoluble coloring material may not be allowed to be present on the surface of the recording medium in some cases. If the content is 50.0 mass % or more on the other hand, the preservation stability of the ink may not be achieved in some cases. Incidentally, the preservation stability of the ink generally means preservation stability in a state without evaporation of water.

Specific examples of water-soluble organic solvents, which is a poor medium usable in the present invention, include isopropanol, triethylene glycol, 2-pyrrolidone, polyethylene glycol having an average molecular weight of 200 or more and diols having at least hydroxyl groups at both terminals of the main chain. Among these, 2-pyrrolidone, 1,5-pentanediol, polyethylene glycol 600 (average molecular weight: 600) and polyethylene glycol 1000 (average molecular weight: 1000) are favorably used. Needless to say, poor media usable in the present invention are not limited thereto.

[Salt]

As the salt used in the present invention, any salt may be used so far as it acts as an electrolyte in the ink. In the present invention, the salt is used as the aggregation accelerator for the water-insoluble coloring material, and the content of the salt in the ink (in a state without evaporation) is set in such a manner that the water-insoluble coloring material can be stably dispersed. When such an ink is applied to a recording medium, the concentration of the salt, i.e., the electrolyte relatively increases in the process of the ink evaporation. The content of the salt in the ink is favorably set to the extent that the water-insoluble coloring material can starts aggregating at this time.

In the present invention, the form of the salt in the ink may be any form of a partially dissociated state and a completely dissociated state. In the present invention, these states are both represented as the ink containing "the salt". The salt usable in the ink according to the present invention means a salt formed by the following cation and an anion coupled with the cation. At least part of the salt is favorably soluble in water. Specific examples of the cation for forming the salt include monovalent metal ions such as $Li^+$, $Na^+$ and $K^+$; divalent metal ions such as $Ca^{2+}$, $Sr^{2+}$, $Ba^{2+}$, $Cu^{2+}$, $Ni^{2+}$, $Mg^{2+}$ and $Zn^{2+}$; trivalent metal ions such as $Al^{3+}$, $Fe^{3+}$, $Cr^{3+}$ and $Y^{3+}$; an ammonium ion; and organic ammonium ions. Specific examples of the anion coupled with the cation include $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCOO^-$, $CH_3COO^-$, $C_2H_4(COO^-)_2$, $C_6H_5COO^-$ and $C_6H_4(COO^-)_2$. Needless to say, the present invention is not limited thereto.

In the ink according to the present invention, the cation is favorably ammonium because excellent water fastness is achieved. In particular, $NH_4NO_3$, $C_2H_4(COONH_4)_2$, $C_6H_4(COONH_4)_2$ and $(NH_4)_2SO_4$ are favorable because water fastness is developed in a relatively short period of time.

Incidentally, in the present invention, a water-soluble dye capable of destabilizing the dispersed state of the water-insoluble coloring material or a polymer having an ionic group may also be used as the salt.

The content (mass %) of the salt in the ink is favorably from 0.01 mass % or more to 10.0 mass % or less, more favorably from 0.1 mass % or more to 5.0 mass % or less based on the total mass of the ink. If the content is less than 0.01 mass %, the effect of the present invention may not be brought about in some cases. If the content is more than 10.0 mass %, the preservation stability of the ink may not be achieved in some cases. Incidentally, the preservation stability of the ink generally means preservation stability in a state without evaporation of water.

[Combined Use of Poor Medium and Salt]

The ink according to the present invention may contain both poor medium and salt. In the present invention, the poor medium and salt are used as the aggregation accelerators for the water-insoluble coloring material, and the contents of the poor medium and salt in the ink (in a state without evaporation) are set in such a manner that the water-insoluble coloring material can be stably dispersed. When such an ink is applied to a recording medium, the concentration of the poor medium and the concentration of the salt (electrolyte) relatively increase in the process of the ink evaporation. The contents of the poor medium and salt in the ink are favorably set to the extent that the water-insoluble coloring material can starts aggregating at this time.

When the poor medium and salt are used in combination, the content mass %) of the poor medium is favorably from 3.0 mass % or more to 40.0 mass % or less, and more favorably from 3.0 mass % or more to 20.0 mass % or less based on the total mass of the ink. When the poor medium and salt are used in combination, the content (mass %) of the salt in the ink is favorably from 0.01 mass % or more to 5.0 mass % or less, and more favorably from 0.1 mass % or more to 5.0 mass % or less based on the total mass of the ink. When the poor medium and salt are used in combination, the ratio of the content of the poor medium to the content of the salt (poor medium/salt) in the ink is favorably from 0.6 or more to 200 or less. When the ratio of the content of the poor medium to the content of the salt falls within the above range, the effect of the present invention can be more efficiently brought about.

(Water-Insoluble Coloring Material)

The coloring material used in the ink according to the present invention is a water-insoluble coloring material such as carbon black or an organic pigment. As the water-insoluble coloring material, any coloring material may be used irrespective of the dispersing system thereof. For example, a polymer-dispersing type coloring material (polymer-dispersion coloring material) using a dispersant or surfactant, or a self-dispersing type coloring material (self-dispersion coloring material), into the surfaces of particles of which a hydrophilic group is introduced, may be used. A microcapsule type coloring material, the dispersibility of which is enhanced, and which can be dispersed without using a dispersant, or a coloring material to the surfaces of particles of which a polymer-containing organic group is chemically bonded (polymer-bonded type self-dispersion coloring material), may also be used. Needless to say, these water-insoluble coloring materials different from one another in dispersing system may also be used in combination. The content (mass %) of the water-insoluble coloring material in the ink is favorably from 0.1 mass % or more to 15.0 mass % or less, and more favorably from 1.0 mass % to 10.0 mass % or less based on the total mass of the ink.

[Carbon Black]

As carbon black, there may be used carbon black such as furnace black, lamp black, acetylene black or channel black. Specifically, for example, the following carbon black may be used: Raven: 1170, 1190 ULTRA-II, 1200, 1250, 1255, 1500, 2000, 3500, 5000, 5250, 5750 and 7000 (all, products of Columbian Carbon Co.); Black Pearls L, Regal: 300R, 400R and 660R, Mogul L, Monarch: 700, 800, 880, 900, 1000, 1100, 1300 and 1400, and Valcan XC-72R (all, products of CABOT CO.); Color Black: FW1, FW2, FW2V, FW18, FW200, S150, S160 and S170, Printex: 35, U, V, 140U and 140V, and Special Black: 4, 4A, 5 and 6 (all, products of Degussa AG); and No. 25, No. 33, No. 40, No. 47, No. 52, No. 900, No. 2300, MCF-88, MA600, MA7, MA8 and MA100 (all, products of MITSUBISHI CHEMICAL CORPORATION).

However, the present invention is not limited thereto, and any carbon black conventionally known may be used. Besides the above, magnetic fine particles such as magnetite and ferrite, and titanium black may also be used as pigments.

[Organic Pigment]

As the organic pigments, may be specifically used, for example, the following pigments:

Water-insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; and other pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

When organic pigments are indicated with COLOR INDEX (C.I.) numbers, for example, the following pigments may be used.

C.I. Pigment Yellow: 12, 13, 14, 17, 20, 24, 74, 83, 86, 93, 109, 110, 117, 120, 125, 128, 137, 138, 147, 148, 151, 153, 154, 166 and 168; C.I. Pigment Orange: 16, 36, 43, 51, 55, 59, 61 and 71; C.I. Pigment Red: 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet: 19, 23, 29, 30, 37, 40 and 50; C.I. Pigment Blue: 15, 15:1, 15:3, 15:4, 15:6, 22, 60 and 64; C.I. Pigment Green: 7 and 36; and C.I. Pigment Brown 23, 25 and 26.

[Dispersant]

In the present invention, a dispersant may also be used for dispersing the water-insoluble coloring material in the ink. As the dispersant, there may be used any resin so far as at least a part thereof has water-solubility. The weight average molecular weight of the resin is favorably from 1,000 or more to 30,000 or less, more favorably from 3,000 or more to 15,000 or less. The content (mass %) of the resin in the ink is favorably from 0.1 mass % or more to 10.0 mass % or less. The ratio of the content of the water-insoluble coloring material to the content of the resin (P/B ratio) in the ink is favorably from 0.02 or more to 150 or less.

As the dispersant, there may be specifically used, for example, a block copolymer, a random copolymer or a graft copolymer comprised of at least 2 monomers (at least one thereof is a hydrophilic monomer) selected from the following group, or a salt thereof. These resins are soluble in an aqueous solution with an alkali dissolved therein (i.e., alkali-soluble resins). Styrene, styrene derivatives, vinylnaphthalene, vinylnaphthalene derivatives, acrylic acid, acrylic acid derivatives, maleic acid, maleic acid derivatives, itaconic acid, itaconic acid derivatives, fumaric acid, fumaric acid derivatives, aliphatic alcohol esters of α,β-ethylenically unsaturated carboxylic acids, vinyl acetate, vinylpyrrolidone, and acrylamide and derivatives thereof. Natural resins such as rosin, shellac and starch may also be used.

[Self-Dispersion Pigment]

In the present invention, a self-dispersing type coloring material (self-dispersion coloring material) is particularly favorably used. The present inventors have found that a self-dispersion coloring material (hereinafter may be referred to as a self-dispersion pigment) is particularly effective for achieving an excellent image density.

When an ink containing a self-dispersion pigment and a poor medium for the self-dispersion pigment and/or a salt (aggregation accelerator) is applied to a recording medium, the following phenomenon generally takes place. Namely, the dispersed state of the self-dispersion pigment in the ink is rapidly destabilized by evaporation of water in the ink on the recording medium or occurrence of liquid-solid separation between a water-soluble organic solvent and solids such as the self-dispersion pigment in the ink, thereby causing aggregation of the self-dispersion pigment. It is considered that relative increase in the concentration of the aggregation accelerator in the ink upon this aggregation exerts a great influence on the destabilization of the dispersed state of the pigment. In fact, with respect to an ink containing the aggregation accelerator and an ink containing no aggregation accelerator, the amount of the self-dispersion pigment present on the surface of the recording medium becomes greater to achieve a higher image density when the ink containing the aggregation accelerator is used.

As the result of an investigation by the present inventors, it has been found that a great difference is made in the resulting image density between inks having the above-described characteristics of dynamic surface tension when the kinds of the self-dispersion pigments used are different even though the same aggregation accelerator is used.

Figure 2:
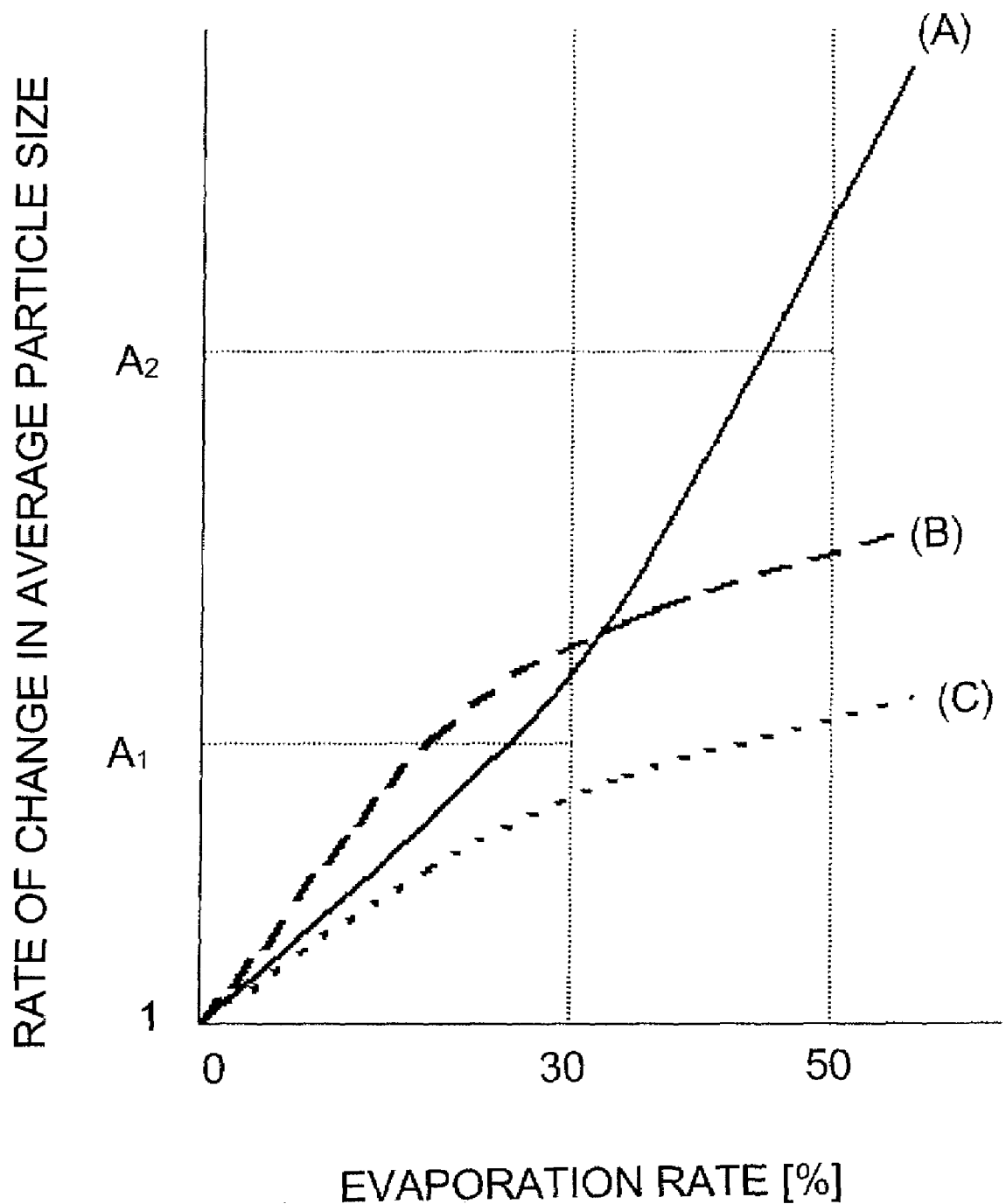
FIG. 2 illustrates the relationship between the evaporation rate of a liquid and the rate of change in average particle size.

The present inventors thus carried out the following investigation as to inks respectively containing various self-dispersion pigments for the purpose of observing, as a model, the aggregation behavior of the self-dispersion pigment when the concentration of the salt in each of the inks was relatively increased by evaporation of water in the ink on a recording medium. Specifically, inks respectively containing various self-dispersion pigments were prepared, and sodium chloride was added to the respective inks to such an extent that the dispersed state could be stably retained. Such inks were evaporated, thereby relatively increasing the concentration of sodium chloride in each of the inks to investigate the relationship between the concentration of sodium chloride and the average particle size of the self-dispersion pigment. On the basis of an ink to which the smallest amount of sodium chloride was added to increase the average particle size of the self-dispersion pigment, the evaporation rate (%) of the ink and the increase rate of the average particle size were taken as the axis of abscissa and the axis of ordinate, respectively, to prepare a graph (FIG. 2). Incidentally, "evaporation rate" in the following description means a value found by the following equation when the ink to which the smallest amount of sodium chloride was added to increase the average particle size of the self-dispersion pigment is evaporated as a reference (initial ink). Namely, the evaporation rate is a value found by the equation Evaporation rate (%)={[(mass of the initial ink)−(mass of the ink after evaporation)]/[mass of the initial ink]}×100.

As a result, it has been found that the self-dispersion pigments are roughly divided into those of curves of 3 types [(A), (B) and (C) in FIG. 2]. It has further been found that when the inks respectively containing these self-dispersion pigments were used to form images, a difference was caused among the resulting image densities. More specifically, the ink containing the self-dispersion pigment exhibiting the aggregation behavior of (A) in FIG. 2 gave a far excellent image density. The ink containing the self-dispersion pigment exhibiting the aggregation behavior of (B) in FIG. 2 gave an excellent image density though it was poorer than the ink of (A). The ink containing the self-dispersion pigment exhibiting the aggregation behavior of (C) in FIG. 2 generally gave a high image density compared with the ink of (B) though the image density was somewhat low on some recording media. From the above fact, the present inventors have found that a tangential gradient of each of the curves in FIG. 2, i.e., change in the average particle size of the self-dispersion pigment attending on the evaporation of the ink has some correlation to the image density.

The relationship between the tangential gradient of the curve in FIG. 2 and the image density will hereinafter be described. The self-dispersion pigment great in the increase rate of the average particle size at the evaporation rate of 30% can be considered to be a self-dispersion pigment high in aggregation speed. The self-dispersion pigment of which the increase rate $A_1$ of the average particle size at an evaporation rate of 30% is a certain value or more (for example, the self-dispersion pigments (A) and (B)) is considered to exhibit the following aggregation behavior on a recording medium. More specifically, it is considered that after the dispersed state of the self-dispersion pigment is destabilized by the evaporation of water in the ink, the aggregation of the self-dispersion pigment quickly takes place. In an ink whose dynamic surface tension is kept at a certain value or more for a certain period of time after the ink is applied to a recording medium, like the ink according to the present invention, the aggregation of the self-dispersion pigment particularly quickly takes place in cooperation with the effect of the aggregation accelerator while the permeation of the ink into the recording medium is inhibited. By such reason, the self-dispersion pigment can be allowed to be particularly effectively present on the surface of the recording medium, so that it is considered that an excellent image density is achieved.

On the other hand, the self-dispersion pigment of which, the increase rate $A_1$ of the average particle size is less than a certain value at the evaporation rate of 30% (for example, the self-dispersion pigment (C)) is considered to exhibit the following aggregation behavior. More specifically, it is considered that after the dispersed state of the self-dispersion pigment is destabilized by the evaporation of water in the ink, the aggregation of the self-dispersion pigment moderately takes place. Therefore, the progress of the aggregation of the self-dispersion pigment, during the period when the dynamic surface tension is kept at a certain value or more for a certain period of time after the ink is applied to a recording medium, becomes relatively slow compared with the above-mentioned cases of (A) and (B). As a result, it is considered that the amount of the self-dispersion pigment present on the surface of the recording medium becomes relatively small, and so the image density is relatively lowered when a recording medium having coarse texture and a lot of voids, i.e., a recording medium high in permeation speed, is used.

The present inventors have carried out an investigation as to the relationship between evaporation rate and image density in respective inks obtained by adding various self-dispersion pigments into an ink having the characteristics of dynamic surface tension as defined in the present invention. As a result, it has been found that there is a great correlation between the aggregation speed of the self-dispersion pigment at an evaporation rate of 30% and the image density. More specifically, it has been found that a self-dispersion pigment having such an aggregation speed that the average particle size increases to at least 15 times as much as that of the initial liquid by the time the evaporation rate reaches 30% is used, whereby a far excellent image density is achieved. The present inventors presume that the reason for this is as follows.

In the ink having the characteristics of dynamic surface tension as defined in the present invention, the dynamic surface tension is kept at a certain value or more for a certain period of time after the ink is applied to a recording medium, and so the permeation of the ink into the recording medium is inhibited. During this period, evaporation of water takes place in the vicinity of the surface of an ink droplet, and the dispersed state of the self-dispersion pigment in the vicinity of the surface of the ink droplet is gradually destabilized to start aggregation of the self-dispersion pigment. Thereafter, the ink applied to the recording medium starts permeating into the recording medium with time. At this time, the scale of the time the ink starts permeating into the recording medium is almost equal to the scale of the time the evaporation rate of water in the vicinity of the surface of the ink droplet applied to the recording medium reaches 30%. From this fact, it is considered that the aggregation speed of the pigment at the evaporation rate of 30% greatly correlates to the image density.

From the above-described fact, it is particularly favorable for achieving a far excellent image density to specifically use a self-dispersion pigment of which the value of the increase rate $A_1$ of the average particle size at an evaporation rate of 30% is 15 or more.

Specifically, it is particularly favorable to use a self-dispersion pigment satisfying the following conditions. The smallest amount of sodium chloride with which the average particle size of a self-dispersion pigment is changed is added to an ink to prepare a liquid (referred to as "initial liquid"). The increase rate $A_1$ of the average particle size of the self-dispersion pigment at the evaporation rate of 30%, which is found by the equation, {[(mass of the initial liquid)−(mass of the liquid after evaporation)]/[mass of the initial ink]}×100, is found from the following equation (1). At this time, a self-dispersion pigment satisfying the conditions of $A_1 \geq 15$ is used, whereby a far excellent image density can be achieved.

Increase rate $A_1$ of average particle size=(Average particle size of the self-dispersion pigment at an evaporation rate of 30%)/(Average particle size of the self-dispersion pigment at an evaporation rate of 0%)　　　[Equation (1)].

Incidentally, when the increase rate of the average particle size is actually determined, the following procedure is favorably conducted. First, the average particle size ($R_0$) of the self-dispersion pigment in the ink is measured. Sodium chloride is then added to the same ink as described above in amounts of 0.1 g, 0.2 g, . . . , N g with an increment of 0.1 g, thereby preparing a plurality of liquids, the total weight of which is adjusted to 100.0 g. The average particle sizes ($R_{0.1}$, $R_{0.2}$, . . . , $R_N$) of the self-dispersion pigments in the respective liquids are respectively measured. At this time, the amount of sodium chloride added at which the average particle size $R_N$ of the self-dispersion pigment becomes larger than the average particle size $R_0$ of the self-dispersion pigment in the liquid containing no sodium chloride is regarded as "the smallest amount with which the average particle size of the self-dispersion pigment is changed".

It is known that water-soluble organic solvents and surfactants may exert an influence in some cases on the dispersed state of the self-dispersion pigment, i.e., the average particle size of the self-dispersion pigment, according to the kinds and contents thereof. As the result of an investigation by the present inventors, however, it has been found that the water-soluble organic solvents and surfactants scarcely exert an influence on the increase rate of the average particle size after the average particle size of the self-dispersion pigment is changed so far as the amount thereof falls within a range generally used in an aqueous ink. Accordingly, the above-described calculation method of the increase rate of the average particle size can be applied likewise to inks containing additives such as dyes, water-soluble organic solvents, surfactants, pH adjustors, preservatives, mildewproofing agents, antioxidants and chelating agents so far as the inks contains a self-dispersion pigment.

As the result of a further investigation by the present inventors, it has been found that the aggregation speed of the self-dispersion pigment at an evaporation rate of 50% where the evaporation of the liquid has further progressed from the state of the evaporation rate of 30% also has a great correlation to the image density. Namely, the self-dispersion pigment of which the increase rate $A_2$ at an evaporation rate of 50% of the average particle size is more than a certain value to the increase rate $A_1$ of the average particle size at an evaporation rate of 30% (for example, the self-dispersion pigment (A)) is considered to exhibit the following aggregation behavior on a recording medium. More specifically, it is considered that the aggregation of the self-dispersion pigment until the evaporation rate reaches 50% from 30% takes place more quickly compared with the aggregation of the self-dispersion pigment until the evaporation rate reaches 30% from 0% (initial). In views of such aggregation speed of the self-dispersion pigment on the recording medium, the aggregation of the self-dispersion pigment acceleratingly takes place as the evaporation of water in the ink more and more progresses. From such reason, it is considered that the self-dispersion pigment can be allowed to be extremely effectively present on the surface of recording medium, so that an extremely excellent image density is achieved.

On the other hand, the self-dispersion pigment of which the increase rate $A_2$ at an evaporation rate of 50% of the average particle size is a certain value or less to the increase rate $A_1$ of the average particle size at an evaporation rate of 30% (for example, the self-dispersion pigment (B)) is considered to exhibit the following aggregation behavior on a recording medium. More specifically, it is considered that the aggregation of the self-dispersion pigment until the evaporation rate reaches 50% from 30% takes place moderately compared with the aggregation behavior until the evaporation rate reaches 30% from 0% (initial).

Since such a difference in aggregation speed between self-dispersion pigments exerts an influence on image property, an ink containing a self-dispersion pigment having an aggregation speed like (A) gives an extremely excellent image density. The reason for this is that the dynamic surface tension of the ink is kept at a certain value or more for a certain period of time after the ink is applied to a recording medium, and the aggregation of the self-dispersion pigment extremely quickly takes place in cooperation with the effect of the aggregation accelerator while the permeation of the ink into the recording medium is inhibited.

The present inventors have carried out an investigation as to the relationship between evaporation rate and image density in respective inks obtained by adding various self-dispersion pigments into an ink having the characteristics of dynamic surface tension as defined in the present invention. As a result, it has been found that there is a particularly great correlation between the aggregation speeds of the self-dispersion pigment at the evaporation rates of 30% and 50% and the image density. More specifically, it has been found that when the self-dispersion pigment having the aggregation speed with which the average particle size increases to at least 15 times as much as that of the initial liquid by the time the evaporation rate reaches 30% as described above further has the following aggregation speed, an extremely excellent image density is achieved. In other words, it has been found that when using a self-dispersion pigment of which the increase rate of the average particle size at an evaporation rate of 50% is more than 5/3 of the increase rate of the average particle size at an evaporation rate of 30%, an extremely excellent image density is achieved.

Specifically, it is particularly favorable to use a self-dispersion pigment satisfying the following conditions. First, in the same manner as described above, the smallest amount of sodium chloride with which the average particle size of a self-dispersion pigment is changed is added to an ink to prepare a liquid (referred to as "initial liquid"). The increase rate $A_2$ of the average particle size of the self-dispersion pigment at the evaporation rate of 50%, which is found by the equation {[(mass of the initial liquid)−(mass of the liquid after evaporation)]/[mass of the initial liquid]}×100, is found by the following equation (2). At this time, a self-dispersion pigment satisfying the conditions of $A_2 > (5/3) \times A_1$ is used, whereby a far excellent image density can be achieved.

Increase rate $A_2$ of average particle size=(Average particle size of the self-dispersion pigment at an evaporation rate of 50%)/(Average particle size of the self-dispersion pigment at an evaporation rate of 0%) [Equation (2)].

The present inventors presume the reason why the far excellent image density can be achieved by using the self-dispersion pigment satisfying the conditions of $A_2 > (5/3) \times A_1$ to be as follows. As described above, the scale of the time the evaporation rate in the vicinity of the surface of the ink droplet after the ink is applied to the recording medium reaches 30% is almost equal to the scale of the time the ink starts permeating into the recording medium. When the time has further elapsed, the permeation of the ink into the recording medium rapidly progresses. In this process, the evaporation of water excessively takes place in the vicinity of the surface of the ink droplet, and so the aggregation of the self-dispersion pigment more and more progresses. When the progress of the aggregation of the self-dispersion pigment is fast at this time, plenty of the self-dispersion pigment can remain on the surface of the recording medium in the process of the rapid permeation of the ink into the recording medium. On the other hand, when the progress of the aggregation of the self-dispersion pigment is slow, the permeation of the ink into the recording medium rapidly progresses, whereby the proportion of the self-dispersion pigment remaining on the surface of the recording medium becomes low. The permeation of the ink into the recording medium is almost completed at the time the evaporation of water in the vicinity of the surface of the ink droplet reaches 50%. In other words, it is considered that the aggregation speed of the self-dispersion pigment at the evaporation rate of 50% particularly greatly correlates to the image density.

It is considered that an extremely excellent image density is achieved because the self-dispersion pigment can be allowed to be very effectively present on the surface of the recording medium in such a manner. Namely, when using such a self-dispersion pigment that the aggregation speed until the evaporation rate reaches 50% from 30% is more than the aggregation speed at the evaporation rate of 30%, an extremely excellent image density can be achieved. In other words, such a self-dispersion pigment that the $A_1$ value at an evaporation rate of 30% is 15 or more, and the $A_2$ value at an evaporation rate of 50% is more than 5/3 times of the $A_1$ value is particularly favorably used.

Specifically, it is particularly favorable to use a self-dispersion pigment satisfying the following conditions. Namely, a self-dispersion pigment of which the increase rate $A_1$ of the average particle size satisfies the conditions of $A_1 \geq 15$ is used, whereby an excellent image density can be achieved. Incidentally, the upper limit of $A_1$ is favorably 50 or less, more favorably 30 or less, though it is not particularly limited. In other words, $A_1$ favorably satisfies the conditions of $15 \leq A_1 \leq 50$, more favorably $15 \leq A_1 \leq 30$. Further, a self-dispersion pigment of which the increase rate $A_2$ of the average particle size satisfies the conditions of $A_2 > (5/3) \times A_1$ is used, whereby an extremely excellent image density can be achieved.

Any self-dispersion pigment may be used so far as it has the characteristics of aggregation speed as described above. In the present invention, a self-dispersion pigment to the surfaces of particles of which a —R—(COOM)$_n$ group is bonded directly or through another atomic group is particularly favorably used. Incidentally, in the above formula, R is an alkylene group or aromatic ring, M is a hydrogen atom, alkali metal, ammonium or organic ammonium, and n is an integer of 1 to 3. The alkylene group favorably has 1 to 6 carbon atoms, and specific examples thereof include methylene, ethylene, propylene, butylene, pentene, hexylene and isopropylene groups. Examples of the aromatic ring include benzene and naphthylene rings. Examples of the alkali metal include lithium, sodium and potassium. Examples of the organic ammonium include acetamido, benzamido, methylamino, butylamino, diethylamino and phenylamino. In the present invention, a self-dispersion pigment obtainable by a diazo coupling method etc. to the surfaces of particles of which a compound having at least the —R—(COOM)$_n$ group is bonded is particularly favorably used.

With respect to the amount of the —R—(COOM)$_n$ group introduced into the surfaces of the pigment particles, it is favorable for achieving the effect of the present invention that the amount introduced per unit surface area of the pigment particles is made larger. Specifically, the ionic group density per unit surface area of the pigment particles is favorably 1.0 μmol/m$^2$ or more, more favorably 2.5 μmol/m$^2$. Incidentally, ionic group density can be found by, for example, measuring the concentration of an alkali ion such as sodium in a pigment dispersion liquid by means of an ion meter and converting the resultant value to an ionic group density.

One or two or more self-dispersion pigment(s) may be used in the ink according to the present invention so far as they satisfy the above-described relationship between the evaporation rate and the increase rate of the average particle size. In order to adjust color tone, other coloring materials may also be used in combination with the self-dispersion pigment. When other coloring materials are used, however, they are favorably used within such a limit that the effect brought about by the use thereof is achieved, and the objects and effects of the present invention are not impaired.

<Relationship Among Water-Insoluble Coloring Material, Salt and Penetrant>

The relation among the water-insoluble coloring material, salt and penetrant in the ink will be described. As described above, the self-dispersion pigment is particularly favorably used as the water-insoluble coloring material in the present invention. There is a close relationship between the ionic group density of the self-dispersion pigment and the contents of the salt and penetrant (particularly, surfactant). In order to efficiently achieve the effect of the present invention, the contents of the salt and surfactant are favorably controlled in the above-described manner.

The ionic group density of the self-dispersion pigment greatly relates to the dispersion stability, and a higher ionic group density shows a tendency to make the dispersed state of the self-dispersion pigment stable. With an ink containing a self-dispersion pigment low in the ionic group density, the dispersed state of the self-dispersion pigment is relatively easily destabilized by evaporation of water in the ink on a recording medium at the point of time the 50 milliseconds have elapsed after the ink has been applied to the recording medium. At this time, the ink containing the self-dispersion pigment low in the ionic group density can cause the self-dispersion pigment to be effectively present on the surface of the recording medium by using a relatively small amount of salt because the stability of the dispersed state of the self-dispersion pigment is relatively low. On the other hand, with an ink containing a self-dispersion pigment high in the ionic group density, the self-dispersion pigment still keeps a stable dispersed state at the point of time the 50 milliseconds have elapsed after the ink has been applied to a recording medium though water in the ink evaporates on the recording medium.

It is thus necessary to use an aggregation accelerator such as a salt for allowing the water-insoluble coloring material to be effectively present on the surface of the recording medium.

As described above, there is a close relationship between the ionic group density of the self-dispersion pigment and the content of the salt in the ink, and have a higher ionic group density shows a tendency to increase the content of the salt required for allowing the water-insoluble coloring material to be effectively present on the surface of the recording medium. There is the following relationship between the ionic group density and the dispersed state of the self-dispersion pigment. When a self-dispersion pigment relatively low in the ionic group density is used, the stability of the dispersed state of the self-dispersion pigment is relatively low as described above when the surface tension of the ink at a lifetime of 50 milliseconds is 49 mN/m or more. For this reason, when a self-dispersion pigment whose ionic group density is 1.0 μmol/m$^2$ or more and less than 2.5 μmol/m$^2$ is used, an excellent image density can be achieved without adding salt to the ink having the characteristics of dynamic surface tension as defined in the present invention. On the other hand, when a self-dispersion pigment relatively high in the ionic group density is used, the stability of the dispersed state of the self-dispersion pigment is relatively high as described above when the surface tension of the ink at a lifetime of 50 milliseconds is less than 49 mN/m. For this reason, when a self-dispersion pigment whose ionic group density is from 2.5 μmol/m$^2$ or more to 4.0 μmol/m$^2$ or less is used as a coloring material for the ink having the characteristics of dynamic surface tension according to the present invention, it is favorable to contain a salt in the ink for achieving an excellent image density.

The ionic group density of the self-dispersion pigment also greatly relates to the content of the penetrant (particularly, surfactant). More specifically, since a site in which the surfactant is adsorbed on the self-dispersion pigment relatively lessens as the ionic group density of the self-dispersion pigment becomes high, the content of the surfactant in an ink can be lessened. On the other hand, since a site in which the surfactant is adsorbed on the self-dispersion pigment relatively increases as the ionic group density of the self-dispersion pigment becomes low, it may be necessary in some cases to increase the content of the surfactant in an ink.

(Other Components)

In addition to the above-described components, moisture-retaining solid component such as urea, urea derivatives, trimethylolpropane and trimethylolethane may be contained in the ink according to the present invention for the purpose of maintaining the moisture retention of the ink. The content (mass %) of the moisture-retaining solid component in the ink is favorably from 0.10 mass % or more to 20 mass % or less, and more preferably from 3.0 mass % or more to 10.0 mass % or less.

In addition to the above-described components, various additives may be contained in the ink according to the present invention within such a limit so as not to impede the effect of the present invention as needed.

For example, the following additives may be specifically used. A nitrogen-containing compound such as urea or ethyleneurea, a pH adjustor, a rust preventive, a preservative, a mildewproofing agent, an antioxidant, an anti-reducing agent, an evaporation accelerator and a chelating agent may be used.

<Ink Jet Recording Method, Ink Cartridge, Recording Unit and Ink Jet Recording Apparatus>

An exemplary ink jet recording apparatus will hereinafter be described. The above-described aqueous ink according to the present invention is particularly favorably used for ink jet.

Figure 3:
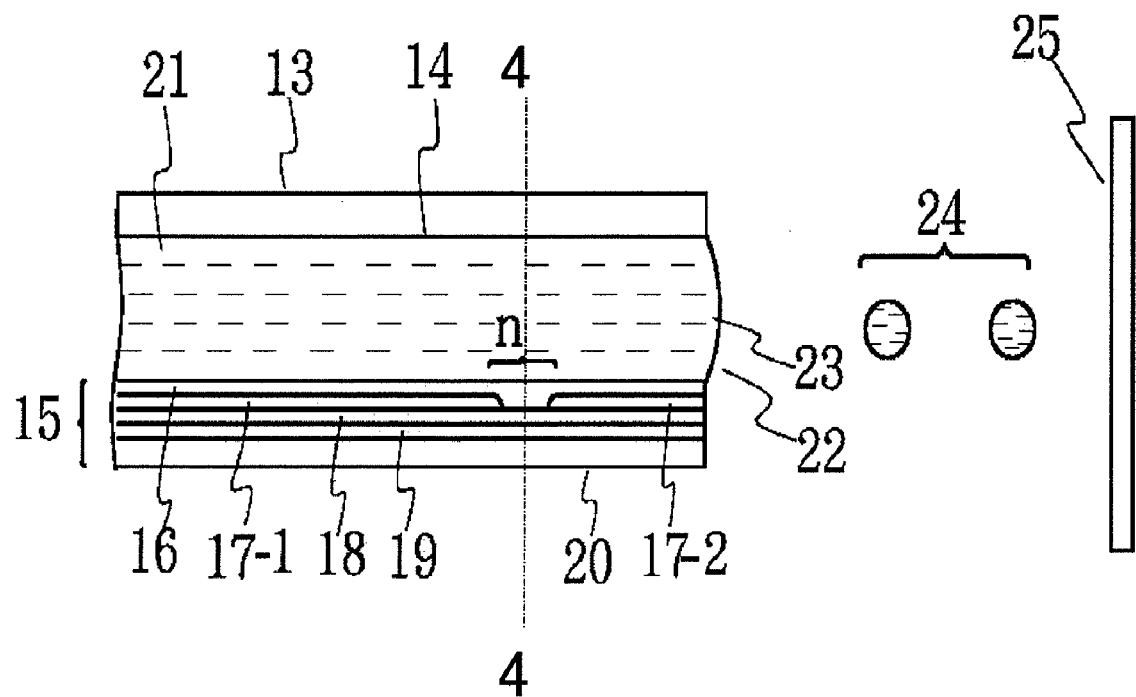
FIG. 3 is a longitudinal cross-sectional view illustrating a head.
Figure 4:
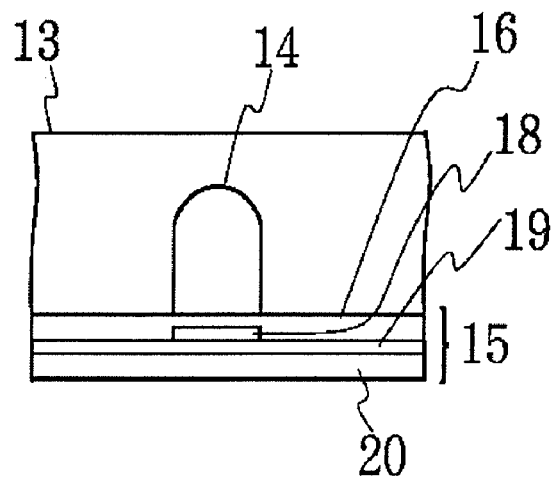
FIG. 4 is a transverse cross-sectional view of the recording head.

First of all, an exemplary construction of a recording head, which is a main part of an ink jet recording apparatus making good use of thermal energy, is illustrated in FIG. 3 and FIG. 4. FIG. 3 is a cross-sectional view of a recording head 13 taken along an ink flow path, and FIG. 4 is a cross-sectional view taken along line 4-4 in FIG. 3. The recording head 13 is obtained by bonding a glass, ceramic, silicon or plastic plate having a flow path (nozzle) 14, through which an ink is passed, to a heating element substrate 15.

The heating element substrate 15 is comprised of a protective layer 16, electrodes 17-1 and 17-2, a heating resistor layer 18, a heat accumulating layer 19 and a substrate 20. The protective layer 16 is formed with silicon oxide, silicon nitride or silicon carbide. The electrodes 17-1 and 17-2 are formed with aluminum, gold or aluminum-copper alloy. The heating resistor layer 18 is formed with a high-melting material such as $HfB_2$, TaN or TaAl. The heat accumulating layer 19 is formed with thermally oxidized silicon or aluminum oxide. The substrate 20 is formed with a material having good heat radiating properties, such as silicon, aluminum or aluminum nitride.

When pulsed electric signals are applied to the electrodes 17-1 and 17-2 of the recording head 13, the heating element substrate 15 rapidly generates heat at the region shown by 'n' to generate bubbles in an ink 21, which is in contact with this region. A meniscus 23 is projected by the pressure of the bubbles, and the ink 21 is ejected through the nozzle 14 of the recording head to fly out of an ejection orifice 22 toward a recording medium 25 in the form of ink droplets 24.

Figure 5:
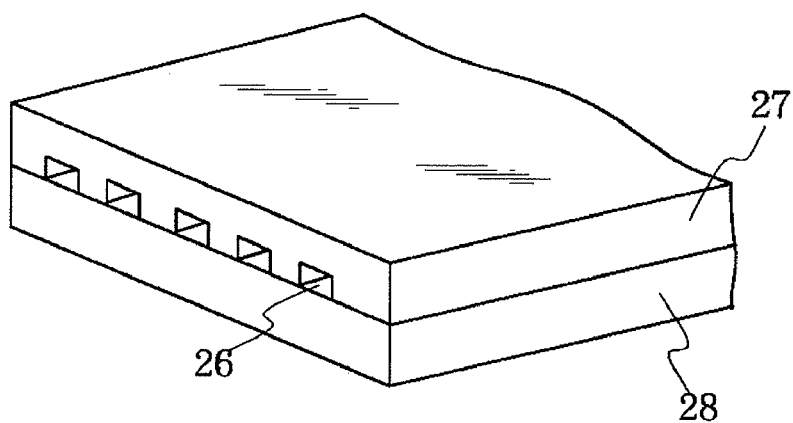
FIG. 5 is a perspective view illustrating the appearance of a recording head obtained by multiplying the recording heads as shown in FIG. 3.

FIG. 5 illustrates an appearance of a multi-head including an array of a number of heads as shown in FIG. 3. The multi-head is formed by bonding a glass plate 27 having a number of nozzles 26 to a heating head 28 similar to that described in FIG. 1.

Figure 6:
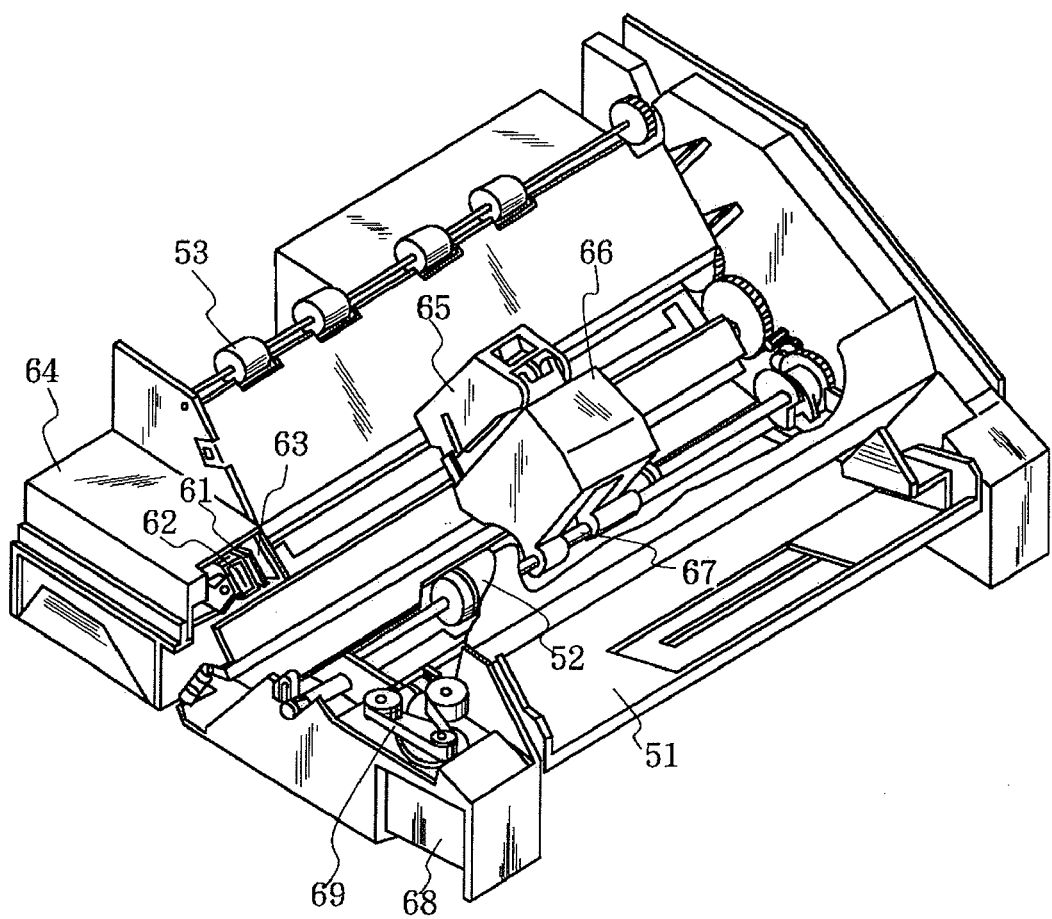
FIG. 6 is a perspective view illustrating an exemplary ink jet recording apparatus.

FIG. 6 illustrates an example of an ink jet recording apparatus in which this recording head has been incorporated. In FIG. 6, one end of a blade 61 that is a wiping member is held and fixed by a blade-holding member to form a cantilever. The blade 61 is arranged at a position adjacent to a recording region, in which a recording head 65 operates, and in the illustrated embodiment, is held in a form protruding into the course through which the recording head 65 is moved. A cap 62 for the face of ejection openings of the recording head 65 is provided at a home position adjacent to the blade 61, and is so constructed that the cap moves in a direction perpendicular to a direction in which the recording head 65 is moved, and comes into contact with the face of the ejection openings to cap the face. An ink absorbing member 63 is provided adjoiningly to the blade 61 and, similar to the blade 61, held in a form protruding into the course through which the recording head 65 is moved. An ejection-recovery portion 64 is constructed by the blade 61, cap 62 and ink absorbing member 63. Water and dust are removed from the face of the ink-ejecting openings by the blade 61 and ink absorbing member 63. The recording head 65 has an ejection-energy-generating means and serves to eject the ink on a recording medium set in an opposing relation to the ejection opening face provided with the ejection openings to conduct recording. The recording head 65 is mounted on a carriage 66 so that the recording head 65 can be moved. The carriage 66 is slidably interlocked with a guide shaft 67 and is connected (not illustrated) at a part thereof to a belt 69 driven by a motor 68. Thus, the carriage 66 can be moved along the guide shaft 67 and hence, the recording head 65 can be moved from a recording region to a region adjacent thereto. A feeding part 51, from which the recording medium is inserted, and feed rollers 52 driven by a motor (not illustrated) are provided. With such a construction, the recording medium is fed to the position opposite to the ejection opening face of the recording head 65, and discharged from a discharge section provided with discharge rollers 53 with the progress of recording. In the above-described construction, the cap 62 in the ejection-recovery portion 64 is receded from the path of motion of the recording head 65 when the recording head 65 is returned to its home position after completion of recording by the recording head 65, and the blade 61 remains protruded into the path of motion. As a result, the ejection opening face of the recording head 65 is wiped. When the cap 62 comes into contact with the ejection opening face of the recording head 65 to cap the face, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection opening face of the recording head 65 is also wiped at the time of this movement. The movement of the recording head 65 to its home position is made not only when the recording is completed or the recording head 65 is recovered for ejection, but also when the recording head 65 is moved between recording regions for the purpose of recording, during which the recording head is moved to the home position adjacent to each recording region at given intervals, where the ejection opening face is wiped in accordance with this movement.

Figure 7:
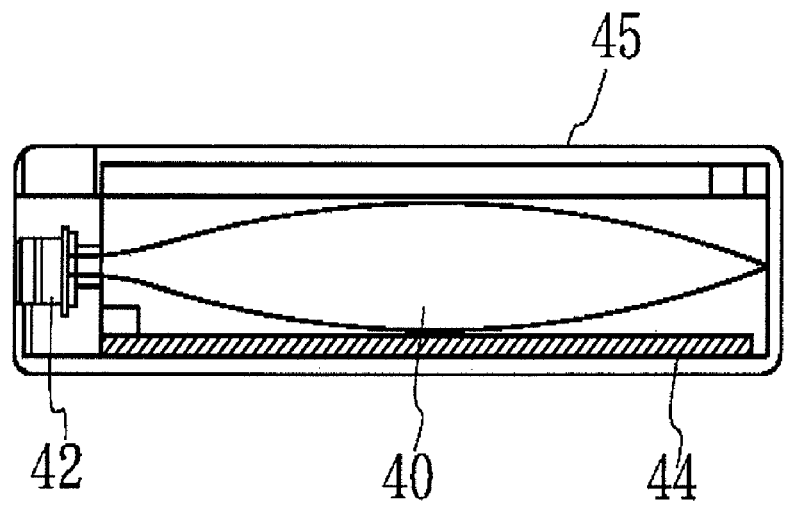
FIG. 7 is a longitudinal cross-sectional view illustrating an ink cartridge.

FIG. 7 illustrates an exemplary ink cartridge in which an ink to be fed to a recording head through an ink feeding member, for example, a tube has been stored. Here, an ink storage portion 40 as exemplified by a bag for the ink, in which the ink to be fed has been stored, is illustrated. One end thereof is provided with a stopper 42 made of rubber. A needle (not illustrated) may be inserted into this stopper 42 so that the ink in the bag 40 for the ink can be fed to the recording head. A waste ink is received in an ink absorbing member 44.

Figure 8:
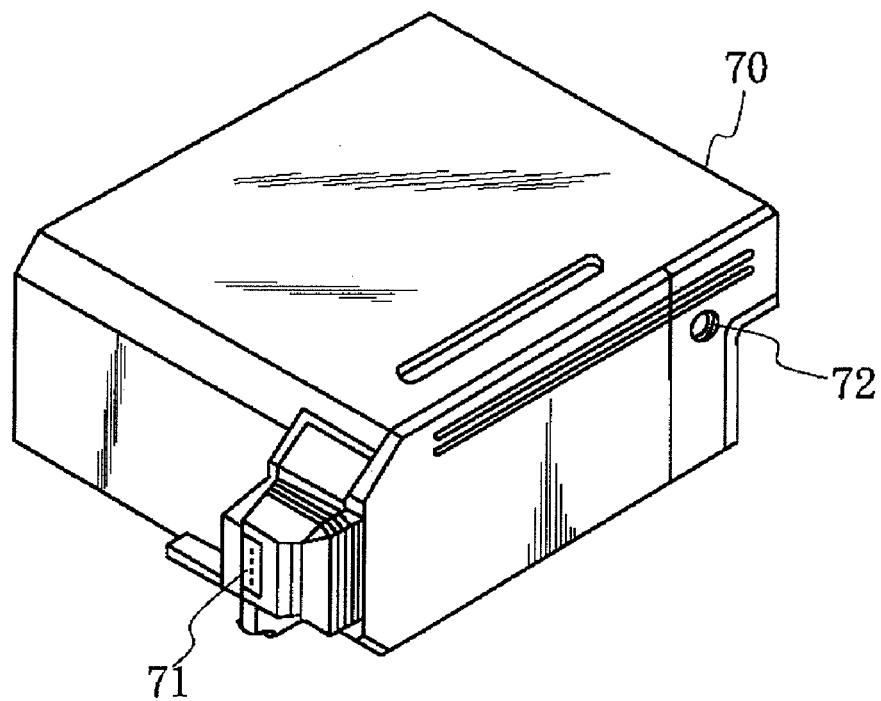
FIG. 8 is a perspective view illustrating an exemplary recording unit.

The ink-jet recording apparatus are not limited to the apparatus in which the recording head and the ink cartridge are separately provided as described above. Therefore, an apparatus in which the recording head and the ink cartridge are integrally formed as illustrated in FIG. 8 may also be suitably used. In FIG. 8, an ink storage portion for storing an ink, for example, an ink absorbing member, is housed in a recording unit 70. The recording unit 70 is so constructed that the ink in such an ink-absorbing member is ejected in the form of ink droplets through a recording head portion 71 having a plurality of ejection openings. The ink storage portion may also be constructed by a bag for the ink, in the interior of which a spring is provided, without using the ink absorbing member. An air passage 72 is provided for communicating the interior of the cartridge with the atmosphere. This recording unit 70 is used in place of the recording head 65 illustrated in FIG. 6, and is detachably installed on the carriage 66.

In the present invention, an ejection quantity per dot of the ink ejected from the recording head of the ink jet recording apparatus is favorably from 5.0 ng or more to 30 ng or less per dot of the ink, particularly favorably from 10.0 ng or more to 25.0 ng or less per dot of the ink. If the ejection quantity per dot of the ink is less than 5.0 ng, the area factor is not sufficiently achieved, so that white stripes may occur in some cases. If the ejection quantity per dot of the ink exceeds 30.0 ng on the other hand, the size of an ink droplet becomes too great, so that it may take a long time for the ink to permeate into a recording medium to lower fixing ability in some cases.

Figure 9:
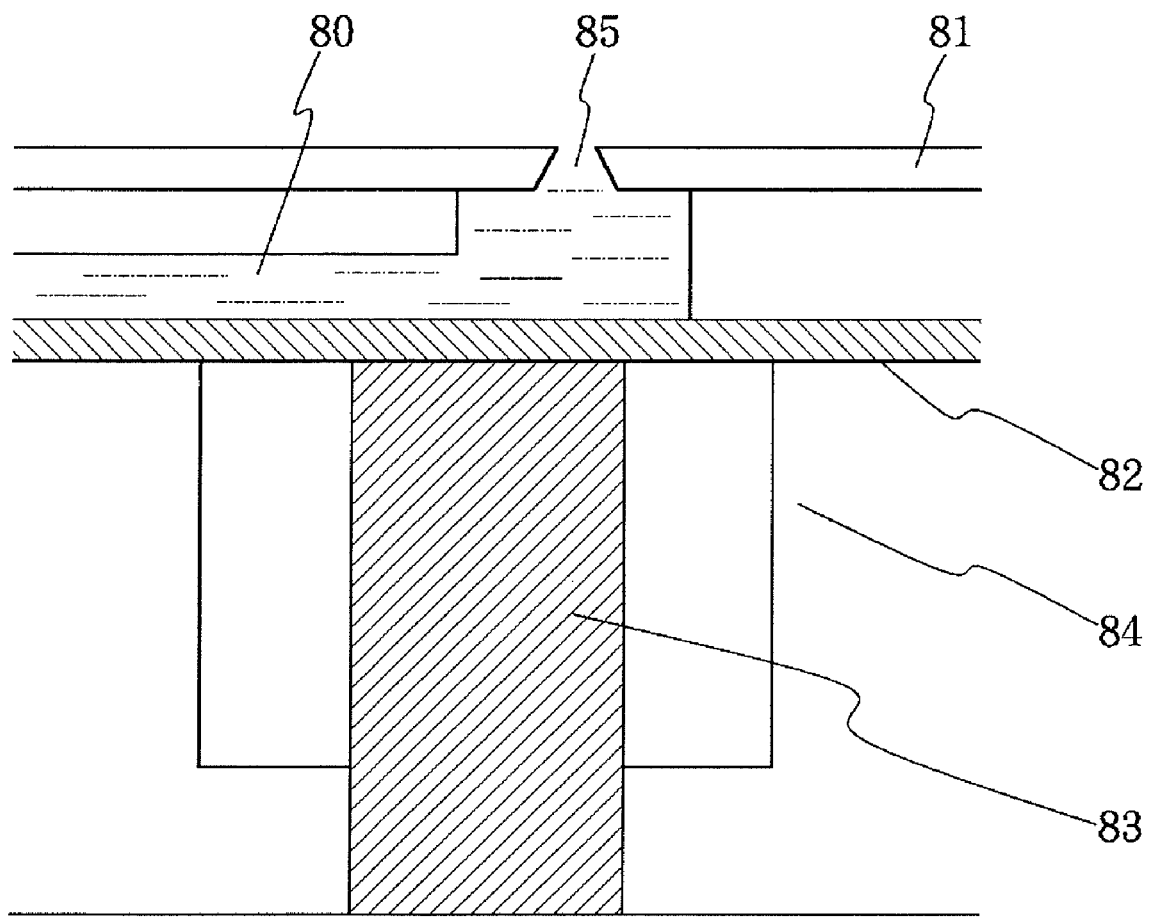
FIG. 9 illustrates an exemplary construction of a recording head.

As a favorable example of an ink jet recording apparatus making good use of mechanical energy, may be mentioned an apparatus having an On-Demand type ink jet recording head of the following construction. Specifically, the ink jet recording apparatus has a nozzle-forming substrate having a plurality of nozzles and pressure-generating devices formed by a piezoelectric material and an electric conductive material and provided in an opposing relation to the nozzles. The apparatus is equipped with an ink filled around the pressure-generating devices and ejects ink droplets from the nozzles by displacing the pressure-generating devices by application of a voltage. FIG. 9 illustrates an example of the construction of a recording head, which is a principal part of the above-described ink jet recording apparatus. The recording head is constructed by an ink flow path 80, an orifice plate 81, a vibration plate 82, a piezoelectric element 83, and a substrate 84 for supporting and fixing the orifice plate 81 and the vibration plate 82 thereon. An ink is ejected as ink droplets having a desired volume through the orifice plate 81 from the ink flow path 80 communicating with an ink chamber (not illustrated). At this time, the ink is ejected by the action of the piezoelectric element 83 bonded to the vibration plate 82 and displaced by an electric signal. The ink flow path 80 is formed with a photosensitive resin or the like. The orifice plate 81 is made of a metal such as stainless steel or nickel, the ejection opening 85 of which is formed by electroforming or punching by press working. The vibration plate 82 is formed with a film of a metal such as stainless steel, nickel or titanium and a high-modulus resin film. The piezoelectric element 83 is formed with a dielectric material such as barium titanate or PZT. The recording head with such construction as described above generates strain stress by applying a pulsed voltage to the piezoelectric element 83. The vibration plate bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording. Such a recording head can be used by incorporating it into an ink-jet recording apparatus similar to that illustrated in FIG. 6. Operation of details of the ink-jet recording apparatus may be conducted in the same manner as described above.

EXAMPLES

The present invention will hereinafter be described more specifically by the following Examples and Comparative Examples. However, the present invention is not limited by these examples unless going beyond the gist of the present invention. Incidentally, "part" or "parts" and "%" in the following examples mean part or parts by mass and % by mass unless expressly noted.

<Preparation of Pigment Dispersion Liquid A>

Three hundred grams of acidic carbon black (trade name: MA-77; product of Mitsubishi Chemical Corporation) having a pH of 3 was added to 1,000 ml of water, and fully mixed, and 450 g of sodium hypochlorite (available chlorine concentration: 12%) was added dropwise to the mixture to stir the mixture for 10 hours at a temperature of 100 to 105° C. After the resultant slurry was filtered through a filter paper (trade name: Standard Filter Paper No. 2; product of Advantec Co.), the resultant particles were fully washed with water to obtain a wet cake of a pigment. The resultant wet cake of a pigment was dispersed in 3,000 ml of water, and desalting was conducted by means of a reverse osmosis membrane until an electrical conductivity reached 0.2 μs to obtain a pigment dispersion liquid having a pH of 8 to 10. The resultant pigment dispersion liquid was concentrated to a pigment concentration of 10 mass % to prepare a dispersion liquid. A pigment dispersion liquid A in which a self-dispersion carbon black A into the surfaces of particles of which a —COONa group had been introduced was dispersed in water was obtained according to the above-described process.

(Preparation of Pigment Dispersion Liquid B)

To a solution with 2.5 g of concentrated hydrochloric acid dissolved in 5.5 g of water, was added 0.8 g of p-aminobenzoic acid in a state cooled to 5° C. A container in which this solution was contained was then placed in an ice bath, and the solution was stirred, whereby the solution always remained in a state kept to 10° C. or lower, to which a solution with 0.9 g of sodium nitrite dissolved in 9 g of water of 5° C. was added. After this solution was stirred for additional 15 minutes, 9 g of a carbon black having a specific surface area of 220 $m^2/g$ and a DBP oil absorption of 105 mL/100 g was added with stirring. Thereafter, the resultant mixture was stirred for additional 15 minutes. After the resultant slurry was filtered through a filter paper (trade name: Standard Filter Paper No. 2; product of Advantec Co.), the resultant particles were fully washed with water and dried in an oven controlled to 110° C., thereby preparing a self-dispersion carbon black. Water was further added to the self-dispersion carbon black obtained above to disperse the carbon black so as to give a pigment concentration of 10 mass %, thereby preparing a dispersion liquid. A pigment dispersion liquid B in a state where a self-dispersion carbon black B into the surfaces of particles of which —$C_6H_4$—COONa group had been introduced was dispersed in water was obtained according to the above-described process.

The ionic group density of the self-dispersion carbon black B prepared above was measured. As a result, the ionic group density was 1.0 $\mu mol/m^2$. The measuring method for the ionic group density used at this time was such that the sodium ion concentration in the pigment dispersion liquid prepared above was measured by means of an ion meter (manufactured by DKK) to convert this value into an ionic group density of the self-dispersion carbon black.

(Preparation of Pigment Dispersion Liquid C)

To a solution with 5 g of concentrated hydrochloric acid dissolved in 5.5 g of water, was added 1.55 g of p-aminobenzoic acid in a state cooled to 5° C. A container in which this solution was contained was then placed in an ice bath, and the solution was stirred, whereby the solution always remained in a condition of being kept to 10° C. or lower, to which a solution with 1.8 g of sodium nitrite dissolved in 9 g of water of 5° C. was added. After this solution was stirred for additional 15 minutes, 6 g of carbon black having a specific surface area of 220 $m^2/g$ and a DBP oil absorption of 105 mL/100 g was added with stirring. Thereafter, the resultant mixture was stirred for additionally 15 minutes. After the resultant slurry was filtered through a filter paper (trade name: Standard Filter Paper No. 2; product of Advantec Co.), the resultant particles were fully washed with water and dried in an oven controlled to 110° C., thereby preparing a self-dispersion carbon black. Water was further added to the self-dispersion carbon black obtained above to disperse the carbon black so as to give a pigment concentration of 10 mass %, thereby preparing a dispersion liquid. A pigment dispersion liquid C in which a self-dispersion carbon black C (pigment C) into the surfaces of particles of which —$C_6H_4$—COONa group had been introduced was dispersed in water was obtained according to the above-described process. The ionic group density of the self-dispersion carbon black C prepared above was measured by the same method as in the self-dispersion carbon black B. As a result, the ionic group density was 2.6 $\mu mol/m^2$.

(Preparation of Pigment Dispersion Liquid D)

To a solution with 5 g of concentrated hydrochloric acid dissolved in 5.5 g of water, was added 1.5 g of 4-amino-1,2-benzenedicarboxylic acid in a state cooled to 5° C. A container in which this solution was contained was then placed in an ice bath, and the solution was stirred, whereby the solution always remained in a condition of being kept to 10° C. or lower, to which a solution with 1.8 g of sodium nitrite dissolved in 9 g of water of 5° C. was added. After this solution was stirred for additional 15 minutes, 6 g of a carbon black having a specific surface area of 220 m²/g and a DBP oil absorption of 105 mL/100 g was added with stirring. Thereafter, the resultant mixture was stirred for additional 15 minutes. After the resultant slurry was filtered through a filter paper (trade name: Standard Filter Paper No. 2; product of Advantec Co.), the resultant particles were fully washed with water and dried in an oven controlled to 110° C., thereby preparing a self-dispersion carbon black. Water was further added to the self-dispersion carbon black obtained above to disperse the carbon black so as to give a pigment concentration of 10 mass %, thereby preparing a dispersion liquid. A pigment dispersion liquid in which a self-dispersion carbon black into the surfaces of particles of which —$C_6H_3$—$(COONa)_2$ group had been introduced was dispersed in water was obtained according to the above-described process.

Incidentally, the ionic group density of the self-dispersion carbon black prepared above was measured. As a result, the ionic group density was 3.1 μmol/m². The measuring method for the ionic group density used at this time was such that the sodium ion concentration in the pigment dispersion liquid prepared above was measured by means of an ion meter (manufactured by DKK) to convert this value into an ionic group density of the self-dispersion carbon black.

<Preparation of Ink>

After the components shown in the following Table 1 were mixed and sufficiently stirred, the resultant respective mixtures were filtered under pressure through a microfilter (product of Fuji Photo Film Co., Ltd.) having a pore size of 3.0 μm, thereby preparing inks 1 to 4.

TABLE 1

|  | Ink | | | |
|---|---|---|---|---|
|  | 1 | 2 | 3 | 4 |
| Pigment dispersion liquid A | 40.0 | | | |
| Pigment dispersion liquid B | | 40.0 | | |
| Pigment dispersion liquid C | | | 40.0 | |
| Pigment dispersion liquid D | | | | 40.0 |
| Pure water | 60.0 | 60.0 | 60.0 | 60.0 |

<Inspection of Aggregation Speed of Self-Dispersion Pigment>

(Inspection of the Smallest Amount of Sodium Chloride to Change the Average Particle Size of Self-Dispersion Pigment)

With respect to the respective inks obtained above, the smallest amount of sodium chloride to change the average particle size of the self-dispersion pigment was inspected. Here, Ink 4 was taken as an example to specifically describe an inspection method.

The components shown in upper columns of the following Table 2 were mixed to prepare respective liquids different from one another in the amount of sodium chloride added. The average particle size of the self-dispersion pigment in each of the liquids was measured by means of a fiber-optics particle analyzer (trade name: FPAR-1000; manufactured by Otsuka Electronics Co., Ltd.). The results thus obtained are shown in a lower column of Table 2.

TABLE 2

|  | Liquid | | | | | | | | | |
|---|---|---|---|---|---|---|---|---|---|---|
|  | a | b | c | d | e | f | g | h | i | j |
| Ink 4 [g] | 40.0 | 40.0 | 40.0 | 40.0 | 40.0 | 40.0 | 40.0 | 40.0 | 40.0 | 40.0 |
| Sodium chloride [g] | 0.0 | 0.2 | 0.4 | 0.6 | 0.7 | 0.8 | 1.0 | 1.2 | 1.4 | 1.6 |
| Pure water [g] | 60.0 | 59.8 | 59.6 | 59.4 | 59.3 | 59.2 | 59.0 | 58.8 | 58.6 | 58.4 |
| Average particle size of self-dispersion pigment [nm] | 101 | 101 | 101 | 101 | 101 | 120 | 853 | 1920 | 3380 | 5650 |

As apparent from Table 2, the average particle size of the self-dispersion pigment was not changed by the amounts of sodium chloride added in the liquids a to e. On the other hand, it was found that the average particle size of the self-dispersion pigment was changed by the amount of sodium chloride added in the liquid f (0.8 g). As a result, it was determined that a liquid containing the smallest amount of sodium chloride to change the average particle size of the self-dispersion pigment in the ink 4 corresponds to the liquid e. This liquid e was regarded as a liquid 4 containing the smallest amount of sodium chloride to change the average particle size of the self-dispersion pigment in the ink 4.

With respect to the inks 1 to 3 as well, the inspection was conducted in the same manner as described above to respectively obtain liquids 1 to 3 containing the smallest amount of sodium chloride to change the average particle size of the self-dispersion pigment. The contents of sodium chloride in the liquids 1 to 3 were 0.2 g for the liquid 1, 0.5 g for the liquid 2 and 1.1 g for the liquid 3. The number of the liquid corresponds to the number of the ink.

(Change in the Average Particle Size of Self-Dispersion Pigment by Evaporation)

The liquids 1 to 4 (referred to as "initial liquids") obtained above were left at rest in an environment of a 30° C. temperature and a 10% relative humidity to evaporate water in the liquids. The average particle size of the self-dispersion pig ment in each liquid was measured at the point of time the evaporation rate (%) found by the following equation (A) reached 30% and 50%.

Evaporation rate(%)={[(mass (g) of the initial ink)− (mass (g) of the ink after evaporation)]/[mass (g) of the initial ink]}×100  [Equation (A)].

Further, the increase rate ($A_1$) of the average particle size was found from the average particle size values of the self-dispersion pigments in the initial liquid (i.e., evaporation rate: 0%) and in the liquid at the evaporation rate of 30% according to the following equation (1). Furthermore, the increase rate ($A_2$) of the average particle size was found from the average particle size values of the self-dispersion pigments in the initial liquid (i.e., evaporation rate: 0%) and in the liquid at the evaporation rate of 50% according to the following equation (2).

Increase rate $A_1$ of average particle size=(Average particle size of the self-dispersion pigment at an evaporation rate of 30%)/(Average particle size of the self-dispersion pigment at an evaporation rate of 0%)  [Equation (1)].

Increase rate $A_2$ of average particle size=(Average particle size of the self-dispersion pigment at an evaporation rate of 50%)/(Average particle size of the self-dispersion pigment at an evaporation rate of 0%)  [Equation (2)].

The values of $A_1$, $A_2$ and $[(5/3) \times A_1]$ were found from the respective values obtained above. Whether the respective liquids satisfy the relationships of $A_1 \geq 15$ and $A_2 > (5/3) \times A_1$ or not was determined. The results thus obtained are shown in Table 3. Incidentally, the results shown in Table 3 are indicated by 'O' where the respective relationships are satisfied or 'x' where the relationships are not satisfied.

TABLE 3

| | | Liquid | | | |
|---|---|---|---|---|---|
| | | 1 | 2 | 3 | 4 |
| Average particle size of self-dispersion pigment at each evaporation rate [nm] | Initial | 273 | 288 | 133 | 120 |
| | Evaporation rate 30% | 1147 | 3802 | 3032 | 1908 |
| | Evaporation rate 50% | 1638 | 5414 | 3591 | 6828 |
| Increase rate of average particle size | $A_1$ (30%) | 4.2 | 13.2 | 22.8 | 15.9 |
| | $A_2$ (50%) | 6.0 | 18.8 | 27.0 | 56.9 |
| (5/3) × $A_1$ | | 7.0 | 22.0 | 38.0 | 26.5 |
| $A_1 \geq 15$ | | x | x | o | o |
| $A_2 > (5/3) \times A_1$ | | x | x | x | o |

<Determination of Poor Medium or Good Medium in Each Water-Soluble Organic Solvent>

The following experiment was conducted in order to select a water-soluble organic solvent acting as a poor medium or a good medium for the pigments in the above-described pigment dispersion liquids A to D. First, each of the pigment dispersion liquids A to D (pigment concentration: 10 mass %) was used to prepare a dispersion liquid A and a water dispersion liquid B for determination of a poor medium and a good medium according to the following formulation ratio.

(Formulation Ratio of Dispersion Liquid)

| [Dispersion liquid A] | |
|---|---|
| Each pigment dispersion liquid (pigment concentration: 10 mass %) | 50 parts |
| Each water-soluble organic solvent described in Table 4 | 50 parts. |
| [Dispersion liquid B] | |
| Each pigment dispersion liquid (pigment concentration: 10 mass %) | 50 parts |
| Pure water | 50 parts. |

(Determination Method and Determination Result)

Ten grams of each of the dispersion liquid A and the dispersion liquid B prepared in the above-described manner was placed in a capped sample bottle made of transparent glass. After the bottle was capped, the dispersion liquid was fully stirred and left at rest for 48 hours at 60° C. Thereafter, each dispersion liquid A cooled to ordinary temperature was used as a sample for determination to measure the average particle size of the pigment in the dispersion liquid A by means of a fiber-optics particle analyzer (trade name: FPAR-1000; manufactured by Otsuka Electronics Co., Ltd.). The average particle size of the pigment in each dispersion liquid B cooled to ordinary temperature was also measured in the same manner as described above. With respect to the dispersion liquid A and dispersion liquid B after preserved for 48 hours at 60° C., the water-soluble organic solvent was determined to be a poor medium where the average particle size of the pigment in the dispersion liquid A was larger than the average particle size of the pigment in the dispersion liquid B, or to be not a poor medium, i.e., a good medium, where the average particle size of the pigment in the dispersion liquid A was equivalent to or smaller than the average particle size of the pigment in the dispersion liquid B.

The average particle size of the pigment was measured in the above-described manner, thereby determining which one of the poor medium and the good medium is assigned to the water-soluble organic solvents. The results are shown in Table 4. The results shown in Table 4 are indicated by 'O' where increase in the average particle size of the pigment was recognized to determine the water-soluble organic solvent to be a poor medium or 'x' where no increase in the average particle size of the pigment was recognized to determine the water-soluble organic solvent to be a good medium.

TABLE 4

| | Pigment dispersion liquid | | | |
|---|---|---|---|---|
| | A | B | C | D |
| Glycerol | x | x | x | x |
| Ethylene glycol | x | x | x | x |
| Trimethylolpropane | x | x | x | x |
| Polyethylene glycol (*1) | o | o | o | o |

(*1): Weight average molecular weight 600.

<HLB Value and Structure of Surfactant>

The HLB values of surfactants were determined. Specifically, the HLB values of main components of the respective surfactants were calculated by means of the Griffin method (following equation (3)) and the Davis method (following equation (4)). The results are shown in Table 5.

Here, the Griffin method and the Davis method are described. The HLB value according to the Griffin method is found by the following equation (3) based on the formula weight of a hydrophilic group and the molecular weight of a surfactant. On the other hand, the HLB value according to the Davis method is found by the following equation (4) by determining the base number peculiar to a functional group in a surfactant.

*HLB* value by Griffin method=[20×(formula weight of hydrophilic group of surfactant)]/(molecular weight of surfactant)  [Equation (3)].

*HLB* value by Davis method=7+Σ(base number of the hydrophilic group)+Σ(base number of the lipophilic group)  [Equation (4)].

Incidentally, in Table 5, EMULMIN CC-100, EMULMIN CC-200, EMULMIN NL90, EMULMIN NL80, EMULMIN CO-50, EMULMIN CO-200 and EMULMIN L380 are all surfactants produced by Sanyo Chemical Industries Co., Ltd., and ACETYLENOL E100 is a surfactant produced by Kawaken Fine Chemicals Co., Ltd.

In Table 5, the structures of main components in the respective surfactants as well as the number of carbon atoms and name of an alkyl group when the structure of such a surfactant is a polyoxyethylene alkyl ether are also shown collectively.

TABLE 5

|  | HLB value of surfactant | | Structure of surfactant | The number of carbon atoms of alkyl group |
|---|---|---|---|---|
|  | Griffin method | Davis method |  |  |
| EMULMIN CC-100 | 12.9 | 4.6 | Polyoxyethylene cetyl ether | 16 (cetyl group) |
| EMULMIN CC-200 | 15.7 | 7.9 | Polyoxyethylene cetyl ether | 16 (cetyl group) |
| EMULMIN NL90 | 13.6 | 6.2 | Polyoxyethylene lauryl ether | 12 (lauryl group) |
| EMULMIN NL80 | 13.1 | 5.8 | Polyoxyethylene lauryl ether | 12 (lauryl group) |
| EMULMIN CO-50 | 9.0 | 2.0 | Polyoxyethylene oleyl ether | 18 (oleyl group) |
| EMULMIN CO-200 | 15.3 | 7.0 | Polyoxyethylene oleyl ether | 18 (oleyl group) |
| EMULMIN L380 | 18.0 | 15.7 | Polyoxyethylene lauryl ether | 12 (lauryl group) |
| ACETYLENOL E100 | 13.3 | — | Acetylene glycol ethylene oxide adduct | — |

<Preparation of Ink>

After the components shown in Table 6 to Table 9 were mixed and sufficiently stirred, the resultant respective mixtures were filtered under pressure through a microfilter (product of Fuji Photo Film Co., Ltd.) having a pore size of 3.0 μm, thereby preparing inks of Examples 1 to 16, Comparative Examples 1 to 10 and Referential Examples 1 to 3. Incidentally, in Table 6 to Table 9, EMULMIN CC-100, EMULMIN CC-200, EMULMIN NL90, EMULMIN NL80, EMULMIN CO-50, EMULMIN CO-200 and EMULMIN L380 are all surfactants produced by Sanyo Chemical Industries Co., Ltd., and ACETYLENOL E100 is a surfactant produced by Kawaken Fine Chemicals Co., Ltd.

TABLE 6

|  | Example | | | | | | | |
|---|---|---|---|---|---|---|---|---|
|  | 1 | 2 | 3 | 4 | 5 | 6 | 7 | 8 |
| Pigment dispersion liquid A | 45.00 |  |  |  |  |  |  |  |
| Pigment dispersion liquid B |  | 45.00 |  |  |  |  | 45.00 |  |
| Pigment dispersion liquid C |  |  | 45.00 |  |  |  |  | 45.00 |
| Pigment dispersion liquid D |  |  |  | 45.00 | 45.00 | 45.00 |  |  |
| Glycerol | 8.00 | 8.00 | 8.00 | 8.00 | 8.00 | 8.00 | 8.00 | 8.00 |
| Ethylene glycol |  |  |  |  |  |  | 5.00 | 5.00 |
| Trimethylolpropane |  |  |  |  |  |  | 10.00 | 10.00 |
| Polyethylene glycol (*1) | 23.00 | 23.00 | 23.00 | 23.00 | 23.00 | 23.00 |  |  |
| Ammonium benzoate |  |  |  |  |  |  | 1.00 | 1.00 |
| EMULMIN CC-100 |  |  |  |  | 0.50 |  | 0.75 |  |
| EMULMIN CC-200 |  |  |  |  |  |  |  |  |
| EMULMIN NL90 |  |  |  |  |  | 0.10 |  |  |
| EMULMIN NL80 |  |  |  |  |  |  | 0.10 | 0.45 |
| EMULMIN CO-50 | 0.75 | 0.75 |  |  |  |  |  |  |
| EMULMIN CO-200 |  |  | 0.75 |  |  |  |  |  |
| EMULMIN L380 |  |  |  |  |  |  |  |  |
| ACETYLENOL E100 |  |  |  |  |  |  |  |  |
| Pure water | 23.25 | 23.25 | 23.25 | 23.50 | 23.90 | 23.90 | 30.25 | 30.55 |

(*1): Weight average molecular weight 600.

TABLE 7

| | Example | | | | | | | |
|---|---|---|---|---|---|---|---|---|
| | 9 | 10 | 11 | 12 | 13 | 14 | 15 | 16 |
| Pigment dispersion liquid A | | | | | | | | |
| Pigment dispersion liquid B | | | | | | 45.00 | | |
| Pigment dispersion liquid C | | | | | | | 45.00 | |
| Pigment dispersion liquid D | 45.00 | 45.00 | 45.00 | 45.00 | 45.00 | | | 45.00 |
| Glycerol | 8.00 | 10.00 | 10.00 | 10.00 | 10.00 | 8.00 | 8.00 | 8.00 |
| Ethylene glycol | 5.00 | 10.00 | 10.00 | 10.00 | | | | |
| Trimethylolpropane | 10.00 | 8.00 | 8.00 | 8.00 | 8.00 | | | |
| Polyethylene glycol (*1) | | | | | 10.00 | 23.00 | 23.00 | 23.00 |
| Ammonium benzoate | 1.00 | 1.00 | 1.00 | 1.00 | 0.70 | 1.00 | 1.00 | 1.00 |
| EMULMIN CC-100 | | 0.50 | | | | | | |
| EMULMIN CC-200 | | | | | | | | |
| EMULMIN NL90 | 0.10 | | 0.10 | | 0.10 | 0.50 | 0.30 | 0.10 |
| EMULMIN NL80 | | | | 0.10 | | | | |
| EMULMIN CO-50 | | | | | | | | |
| EMULMIN CO-200 | | | | | | | | |
| EMULMIN L380 | | | | | | | | |
| ACETYLENOL E100 | | | | | | | | |
| Pure water | 30.90 | 25.50 | 25.90 | 25.90 | 26.20 | 22.50 | 22.70 | 22.90 |

(*1): Weight average molecular weight 600.

TABLE 8

| | Comparative Example | | | | | | | | | |
|---|---|---|---|---|---|---|---|---|---|---|
| | 1 | 2 | 3 | 4 | 5 | 6 | 7 | 8 | 9 | 10 |
| Pigment dispersion liquid A | 45.00 | | | | | | | | | |
| Pigment dispersion liquid B | | 45.00 | | | | 45.00 | | | | |
| Pigment dispersion liquid C | | | 45.00 | | | | | 45.00 | | 45.00 |
| Pigment dispersion liquid D | | | | 45.00 | 45.00 | | 45.00 | | 45.00 | |
| Glycerol | 8.00 | 8.00 | 8.00 | 8.00 | 8.00 | 8.00 | 8.00 | 8.00 | 8.00 | 8.00 |
| Ethylene glycol | | 5.00 | 5.00 | | | 5.00 | 5.00 | 5.00 | 5.00 | 5.00 |
| Trimethylolpropane | | 10.00 | 10.00 | | | 10.00 | 10.00 | 10.00 | 10.00 | 10.00 |
| Polyethylene glycol (*1) | 23.00 | | | 23.00 | 23.00 | | | | | |
| Ammonium benzoate | | 1.00 | 1.00 | | | | | | | |
| EMULMIN CC-100 | | | | | | | | | | |
| EMULMIN CC-200 | | | | | | | | | | |
| EMULMIN NL90 | | 0.80 | | | | 0.60 | | | | |
| EMULMIN NL80 | | | | | | | 0.60 | | | |
| EMULMIN CO-50 | | | | | | | | | | |
| EMULMIN CO-200 | | | | | | | | | | 0.60 |
| EMULMIN L380 | 0.20 | | 0.20 | | | | | 0.20 | | |
| ACETYLENOL E100 | | | | | 0.50 | | | | 0.50 | |
| Pure water | 23.80 | 30.20 | 30.80 | 23.50 | 24.00 | 31.40 | 31.40 | 31.80 | 31.50 | 31.40 |

(*1): Weight average molecular weight 600.

TABLE 9

| | Referential Example | | |
|---|---|---|---|
| | 1 | 2 | 3 |
| Pigment dispersion liquid A | | | |
| Pigment dispersion liquid B | 45.00 | | |
| Pigment dispersion liquid C | | 45.00 | |
| Pigment dispersion liquid D | | | 45.00 |
| Glycerol | 8.00 | 8.00 | 10.00 |
| Ethylene glycol | 5.00 | 5.00 | 10.00 |
| Trimethylolpropane | 5.00 | 5.00 | 8.00 |
| Polyethylene glycol (*1) | | | |
| Ammonium benzoate | | | |

TABLE 9-continued

|  | Referential Example | | |
|---|---|---|---|
|  | 1 | 2 | 3 |
| EMULMIN CC-100 | 0.75 | | |
| EMULMIN CC-200 | | | 0.30 |
| EMULMIN NL90 | | | |
| EMULMIN NL80 | | | |
| EMULMIN CO-50 | | 0.75 | |
| EMULMIN CO-200 | | | |
| EMULMIN L380 | | | |
| ACETYLENOL E100 | | | |
| Pure water | 36.25 | 36.25 | 26.70 |

(*1): Weight average molecular weight 600.

<Evaluation>

(Measurement of Dynamic Surface Tension)

With respect to the respective inks obtained above, the dynamic surface tensions of the inks at (1) a lifetime of 50 milliseconds and (2) a lifetime of 5,000 milliseconds were measured by means of an apparatus that conducts measurement according to the maximum bubble pressure method (BP-D4; manufactured by Kyowa Interface Science Co., Ltd.). The evaluation results as to the dynamic surface tensions are shown in Table 10.

(Evaluation of Image Density, Fixing Ability and White Stripe)

Each of the inks obtained above was charged into an ink cartridge, and the ink cartridge was installed in a modified machine of an ink-jet recording apparatus iP3100 (manufactured by Canon Inc.) which ejects ink from a recording head through an action of a thermal energy. Thereafter, an image (details thereof will be described subsequently) was formed on the following recording media. Incidentally, the ejection quantity per dot of the ink is within 24 ng±10%. For the printer driver, a default mode is selected.

Kind of paper: plain paper.
Print quality: standard.
Color adjustment: automatic.

As the recording media, were used the following 4 kinds of plain paper for copying.

PPC Paper Office Planner, product of Canon Inc.
PPC Paper 4025, product of Xerox Co.
PPC Paper Bright White, product of Hewlett-Packard Co.
PPC Paper Hammer Mill Jet Print, product of International Paper.

[Image Density]

Each of the inks obtained above was used to form a solid image (image of a recording duty of 100%) of 2 cm×2 cm. After the resultant recorded matter was left to stand for one day, the image density of the solid image was measured by means of a reflection densitometer (trade name: Macbeth RD-918; manufactured by Macbeth Company) to make evaluation as to the image density. The evaluation standard of the image density is as follows. The evaluation results are shown in Table 10.

AAA: Average value of image densities on the 4 kinds of paper is 1.40 or more, image densities on at least 2 kinds of paper are 1.50 or more, and minimum value of the image densities on the 4 kinds of paper is 1.35 or more;

AA: Average value of image densities on the 4 kinds of paper is 1.40 or more, image density on one kind of paper is 1.50 or more, and minimum value of the image densities on the 4 kinds of paper is 1.35 or more;

A: Average value of image densities on the 4 kinds of paper is 1.40 or more, image density on one kind of paper is 1.50 or more, and minimum value of the image densities on the 4 kinds of paper is 1.30 or more and less than 1.35;

B: Average value of image densities on the 4 kinds of paper is 1.40 or more, and minimum value of the image densities on the 4 kinds of paper is 1.30 or more and less than 1.35;

C: Average value of image densities on the 4 kinds of paper is 1.4 or more, and minimum value of the image densities on the 4 kinds of paper is 1.25 or more and less than 1.30;

D: Average value of image densities on the 4 kinds of paper is less than 1.40, and minimum value of the image densities on the 4 kinds of paper is less than 1.25.

[Fixing Ability]

Each of the inks obtained above was used to form a solid image (image having a recording duty of 100%) of 1 cm×1 cm. The solid image after 10 seconds from the recording was rubbed with Silbon paper, on which a weight of 40 g/cm$^2$ was placed to visually observe the degree of stain, thereby making evaluation as to the fixing ability. The evaluation standard of the fixing ability is as follows. The evaluation results are shown in Table 10.

A: No stain is observed on all the 4 kinds of paper:
B: Stain is observed on one kind of paper;
C: Stain is observed on 2 or 3 kinds of paper.

[White Stripe]

Each of the inks obtained above was used to form a solid image (image having a recording duty of 100%) of 5 cm×15 cm. Thereafter, the condition of white stripes at the portion of the image in the recorded matter was visually observed to make evaluation as to white stripes. The evaluation standard of the white stripes is as follows. The evaluation results are shown in Table 10.

A: No white stripe was observed on all the 4 kinds of paper;
B: White stripes were observed on 1 to 3 kinds of paper.

TABLE 10

|  |  | Dynamic surface tension [mN/m] | | | | |
|---|---|---|---|---|---|---|
|  |  | (1) Lifetime of 50 msec | (2) Lifetime of 5000 msec | Image density | Fixing ability | White stripe |
| Example | 1 | 53.8 | 36.1 | A | A | B |
|  | 2 | 54.0 | 36.2 | A | A | B |
|  | 3 | 55.0 | 38.0 | AA | A | B |
|  | 4 | 50.9 | 36.2 | AAA | A | A |
|  | 5 | 49.2 | 32.3 | AAA | A | A |
|  | 6 | 47.1 | 30.9 | AAA | A | A |
|  | 7 | 52.9 | 36.2 | A | A | A |
|  | 8 | 50.7 | 30.8 | AA | A | A |
|  | 9 | 50.3 | 32.1 | AAA | A | A |
|  | 10 | 52.4 | 37.2 | AAA | A | A |
|  | 11 | 50.3 | 32.1 | AAA | A | A |
|  | 12 | 48.0 | 31.0 | AAA | A | A |
|  | 13 | 50.1 | 32.0 | AAA | A | A |
|  | 14 | 49.0 | 32.0 | A | A | A |
|  | 15 | 49.3 | 32.2 | AA | A | A |
|  | 16 | 49.2 | 32.0 | AAA | A | A |
| Comparative Example | 1 | 46.7 | 44.2 | D | B | A |
|  | 2 | 38.0 | 32.0 | D | A | A |
|  | 3 | 46.9 | 46.6 | D | C | A |
|  | 4 | 36.4 | 29.4 | D | A | A |
|  | 5 | 59.3 | 57.1 | AA | C | B |
|  | 6 | 48.8 | 30.8 | D | A | A |
|  | 7 | 48.1 | 32.1 | C | A | A |
|  | 8 | 46.8 | 46.5 | D | C | A |
|  | 9 | 36.7 | 29.5 | D | A | A |
|  | 10 | 57.0 | 38.1 | C | B | B |
| Referential Example | 1 | 57.0 | 36.1 | C | A | B |
|  | 2 | 54.2 | 36.0 | B | A | B |
|  | 3 | 52.0 | 42.3 | B | B | A |

It was found from Table 10 that the inks of Examples 1 to 16, whose dynamic surface tension at a lifetime of 50 milliseconds is high, whose dynamic surface tension at a lifetime of 5,000 milliseconds is low, and which contain a poor medium for the water-insoluble coloring material and/or a salt, are excellent in image density and fixing ability. It was also found that the inks of Examples 4 to 16, whose dynamic surface tension at a lifetime of 50 milliseconds is 53 or lower, provide images free of white stripes. On the other hand, it was found that the inks of Comparative Examples 1 to 4, 8 and 9, whose dynamic surface tension at a lifetime of 50 milliseconds is low, are low in image density. It was also found that the inks of Comparative Examples 1, 3, 5 and 8, whose dynamic surface tension at a lifetime of 5,000 milliseconds is high, are low in fixing ability. It was further found that the inks of Comparative Examples 6 to 9, which contain neither a poor medium for the water-insoluble coloring material nor a salt, are low in image density irrespective of the value of the dynamic surface tension.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-145354, filed May 25, 2006, and Japanese Patent Application No. 2007-136687, filed May 23, 2007, which are hereby incorporated by reference herein in their entirety.

What is claimed is:

1. An aqueous ink comprising:
water;
a water-soluble organic solvent;
a water-insoluble coloring material;
a surfactant; and
a salt,
wherein the surfactant is a polyoxyethylene alkyl ether,
wherein the salt is formed of (a) a cation selected from the group consisting of a metal ion, an ammonium ion, and an organic ammonium ion and (b) an anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCOO^-$, $CH_3COO^-$, $C_2H_4(COO^-)_2$, $C_6H_5COO^-$, and $C_6H_4(COO^-)_2$,
wherein a dynamic surface tension, at 25° C., of the aqueous ink at a lifetime of 50 milliseconds determined by a maximum bubble pressure method is higher than 47 mN/m,
wherein a dynamic surface tension, at 25° C., at a lifetime of 5,000 milliseconds determined by the maximum bubble pressure method is 38 mN/m or lower, and
wherein the content (mass %) of the surfactant is from 0.10 mass % or more to 0.75 mass % or less based on the total mass of the ink.

2. The aqueous ink according to claim 1, wherein the dynamic surface tension of the aqueous ink at a lifetime of 50 milliseconds determined by the maximum bubble pressure method is 53 mN/m or lower.

3. The aqueous ink according to claim 1, wherein the water-insoluble coloring material is a self-dispersion pigment.

4. The aqueous ink according to claim 3, wherein the self-dispersion pigment is a self dispersion pigment of which the increase rate $A_1$ of the average particle size, which is found by the following equation (1), at an evaporation rate of 30% when the aqueous ink is used to prepare a liquid containing a smallest amount of sodium chloride to change the average particle size of the self dispersion pigment and then the liquid is evaporated satisfies the conditions of $A_1 \geq 15$ Increase rate $A_1$ of average particle size=(Average particle size of the self-dispersion pigment at the evaporation rate of 30%)/(Average particle size of the self-dispersion pigment at the evaporation rate of 0%)   [Equation (1)].

5. The aqueous ink according to claim 4, wherein the self-dispersion pigment is a self-dispersion pigment of which the increase rate $A_2$ of the average particle size, which is found by the following equation (2), at an evaporation rate of 50% when the liquid is evaporated satisfies the conditions of $A_2 > (5/3) \times A_1$ Increase rate $A_2$ of average particle size=(Average particle size of the self-dispersion pigment at the evaporation rate of 50%)/(Average particle size of the self-dispersion pigment at the evaporation rate of 0%)   [Equation (2)].

6. The aqueous ink according to claim 1, wherein a HLB value of the surfactant as determined by the Griffin method is from 8.0 or more to 15.5 or less.

7. The aqueous ink according to claim 1, wherein the alkyl group in the polyoxyethylene alkyl ether has 12 to 18 carbon atoms.

8. The aqueous ink according claim 1, which is an ink-jet ink.

9. An ink jet recording method comprising ejecting an ink by an ink jet method, wherein the ink is the aqueous ink according to claim 1.

10. The ink jet recording method according to claim 9, wherein the ink jet recording method is an ink jet recording method with which the ink is ejected from a recording head by the action of thermal energy.

11. An ink cartridge comprising an ink storage portion storing an ink, wherein the ink stored in the ink storage portion is the aqueous ink according to claim 1.

12. A recording unit comprising an ink storage portion storing an ink and a recording head for ejecting the ink, wherein the ink stored in the ink storage portion is the aqueous ink according to claim 1.

13. An ink jet recording apparatus comprising an ink storage portion storing an ink and a recording head for ejecting the ink, wherein the ink stored in the ink storage portion is the aqueous ink according to claim 1.

14. The aqueous ink according to claim 1, wherein the ink further comprises a poor medium for the water-insoluble coloring material.

15. The aqueous ink according to claim 14, wherein the ratio of the content (mass %) of the poor medium to the content (mass %) of the salt in the ink is from 0.6 mass % or more to 200 mass % or less.

16. The aqueous ink according to claim 6, wherein the HLB value of the surfactant as determined by the Griffin method is from 12.9 or more to 15.5 or less.

17. The aqueous ink according to claim 3, wherein an ionic group density per unit surface area of a particle of the self-dispersion pigment is 1.0 μmol/m² or more.

18. The aqueous ink according to claim 3, wherein an ionic group density per unit surface area of a particle of the self-dispersion pigment is 2.5 μmol/m² or more.

19. The aqueous ink according to claim 3, wherein the self-dispersion pigment is carbon black.

* * * * *